United States Patent
Zhao et al.

(10) Patent No.: US 9,560,565 B2
(45) Date of Patent: Jan. 31, 2017

(54) CONNECTION HANDOVER METHOD BASED ON NEAR FIELD COMMUNICATION, AND CORRESPONDING APPARATUS

(71) Applicant: Huawei Device Co., Ltd., Shenzhen (CN)

(72) Inventors: Xiaona Zhao, Beijing (CN); Zhihao Jin, Beijing (CN); Guoqing Li, Beijing (CN); Miao Wang, Shenzhen (CN); Xinmiao Chang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/774,873

(22) PCT Filed: Mar. 18, 2014

(86) PCT No.: PCT/CN2014/073571
§ 371 (c)(1),
(2) Date: Sep. 11, 2015

(87) PCT Pub. No.: WO2014/146563
PCT Pub. Date: Sep. 25, 2014

(65) Prior Publication Data
US 2016/0037413 A1   Feb. 4, 2016

(30) Foreign Application Priority Data
Mar. 18, 2013   (CN) .......................... 2013 1 0086370

(51) Int. Cl.
*H04W 36/14* (2009.01)
*H04W 4/00* (2009.01)
(Continued)

(52) U.S. Cl.
CPC ............ *H04W 36/14* (2013.01); *H04W 4/008* (2013.01); *H04W 36/0033* (2013.01);
(Continued)

(58) Field of Classification Search
CPC ..... H06F 3/1292; H04W 36/14; H04W 76/02; H04W 76/023; H04W 4/008; H04W 8/005; H04W 12/04; H04W 12/06; H04W 84/12; H04B 5/02; H04B 5/0031
(Continued)

(56) References Cited

U.S. PATENT DOCUMENTS 8,224,246 B2   7/2012   Suumaeki et al.
8,462,734 B2   6/2013   Laine et al.
(Continued)

FOREIGN PATENT DOCUMENTS

CN   102404861 A   4/2012
CN   102714829 A   10/2012

OTHER PUBLICATIONS

"Wi-Fi Protected Setup Specification," Wi-Fi Alliance, Version 1.0h (Dec. 2006).
(Continued)

*Primary Examiner* — Phuoc H Doan
(74) *Attorney, Agent, or Firm* — Leydig, Voit & Mayer, Ltd.

(57) ABSTRACT

The present invention discloses a connection handover method for near field communication, and further disclose a connection handover apparatus. The method includes: acquiring, by a zeroth terminal, idle connection resource information of the zeroth terminal; receiving a request message that is sent by a first terminal and is used for initiating a connection handover process or used for notifying the zeroth terminal that a connection handover process
(Continued)

needs to be performed; and determining, according to the request message, that the following determining needs to be performed: determining, according to the idle connection resource information of the zeroth terminal, whether the zeroth terminal has an idle connection resource, if yes, sending a response message to the first terminal, so as to feed back connection configuration information of the zeroth terminal to the first terminal, and if not, skipping feeding back connection configuration information of the zeroth terminal to the first terminal.

16 Claims, 14 Drawing Sheets

(51) Int. Cl.
    *H04W 76/02*     (2009.01)
    *H04W 36/00*     (2009.01)
    *H04W 84/18*     (2009.01)
    *H04W 88/02*     (2009.01)

(52) U.S. Cl.
    CPC ............ *H04W 76/02* (2013.01); *H04W 84/18* (2013.01); *H04W 88/02* (2013.01)

(58) Field of Classification Search
    USPC ... 455/41.1, 41.2, 426.1, 417; 709/220, 227; 345/2.3; 726/6; 370/331
    See application file for complete search history.

(56) References Cited

U.S. PATENT DOCUMENTS

| | | |
|---|---|---|
| 2010/0254349 A1 | 10/2010 | Aibara et al. |
| 2011/0183614 A1 | 7/2011 | Tamura et al. |
| 2011/0275316 A1 | 11/2011 | Suumaki et al. |
| 2012/0100803 A1 | 4/2012 | Suumaeki et al. |
| 2012/0309309 A1 | 12/2012 | Cho et al. |
| 2014/0148098 A1* | 5/2014 | Song .................. H04W 76/023 455/41.1 |
| 2014/0274058 A1 | 9/2014 | Son et al. |
| 2015/0296416 A1* | 10/2015 | Lee ...................... H04W 8/005 370/331 |

OTHER PUBLICATIONS

"Connection Handover," Technical Specification, NFC Forum, Connection Handover 1.2 (Jul. 7, 2010).

Dang et al., "Simplify embedded Wi-Fi connectivity with Near-Filed Communications," embedded, http://www.embedded.com (Sep. 7, 2012).

Office Action in corresponding Japanese Patent Application No. 2016-503528 (Nov. 8, 2016).

* cited by examiner

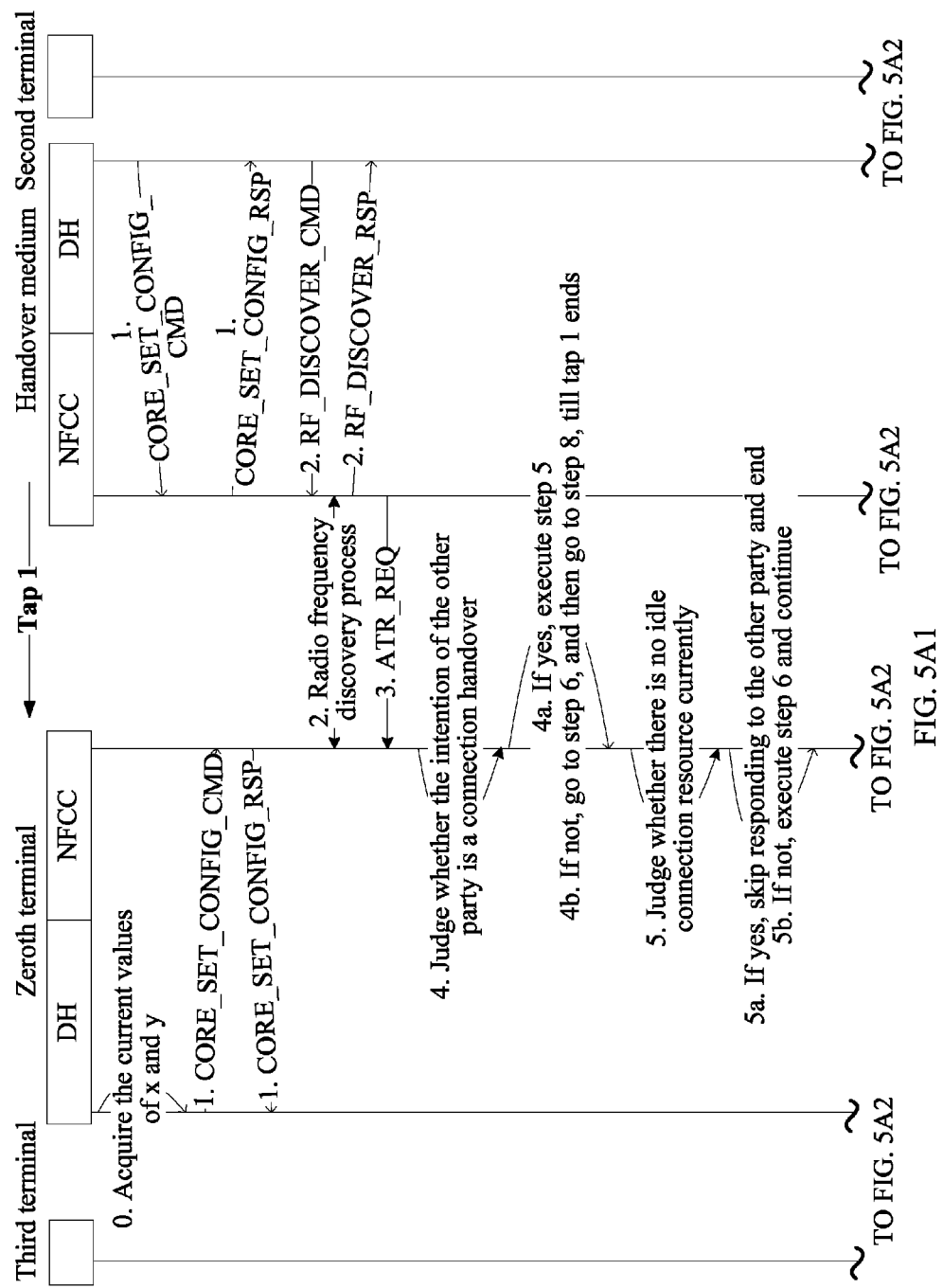
FIG. 5A1

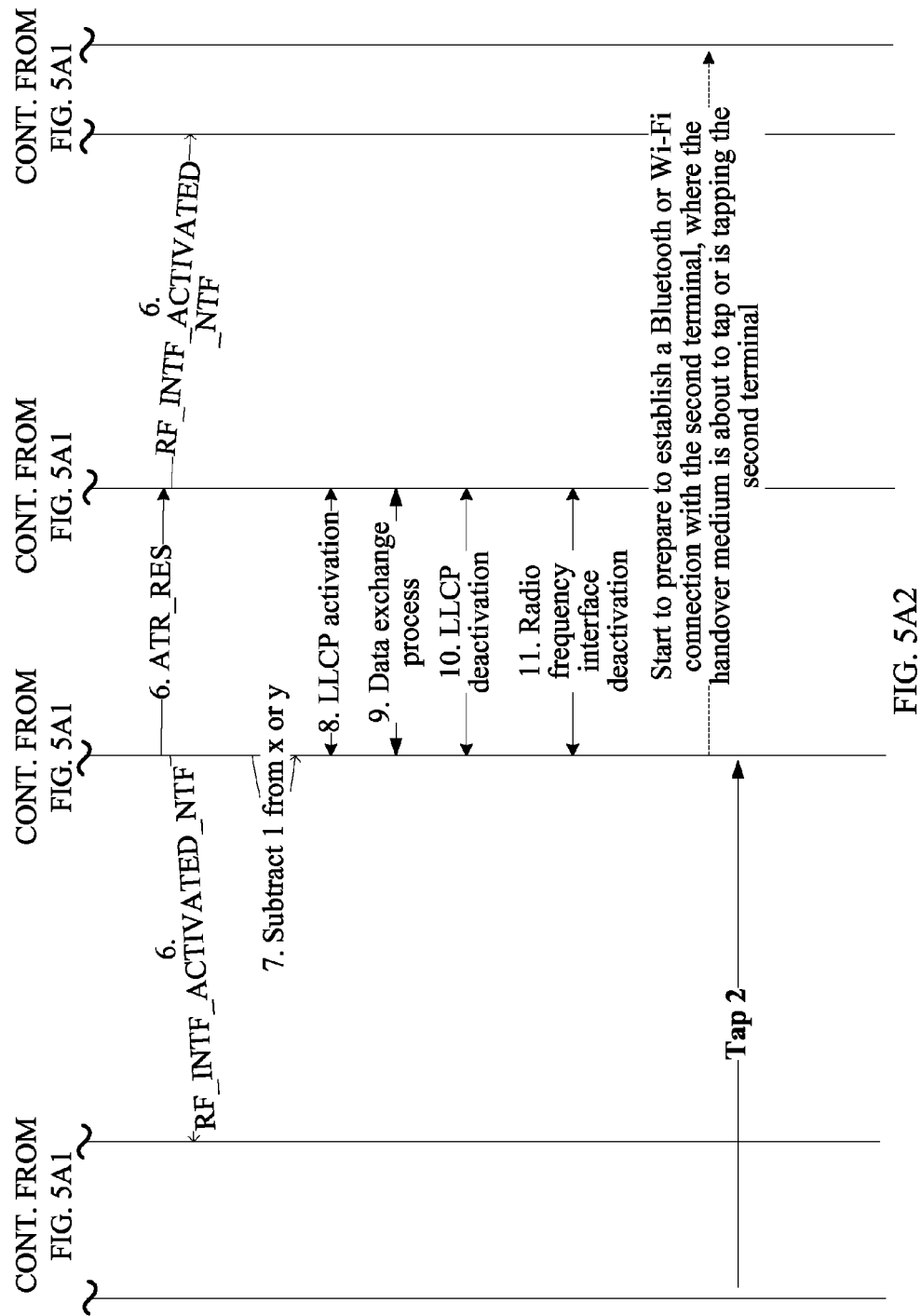

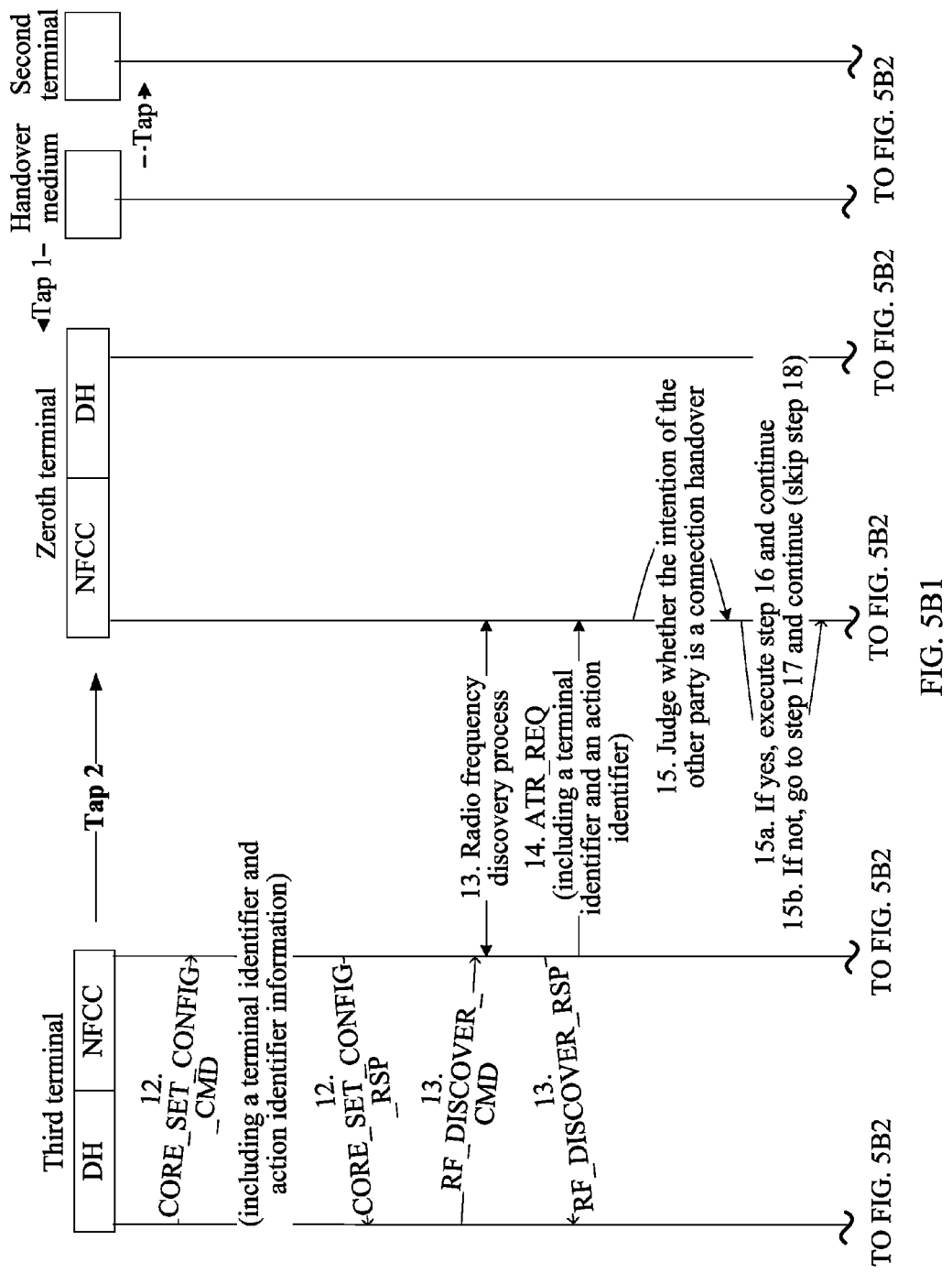
FIG. 5B1

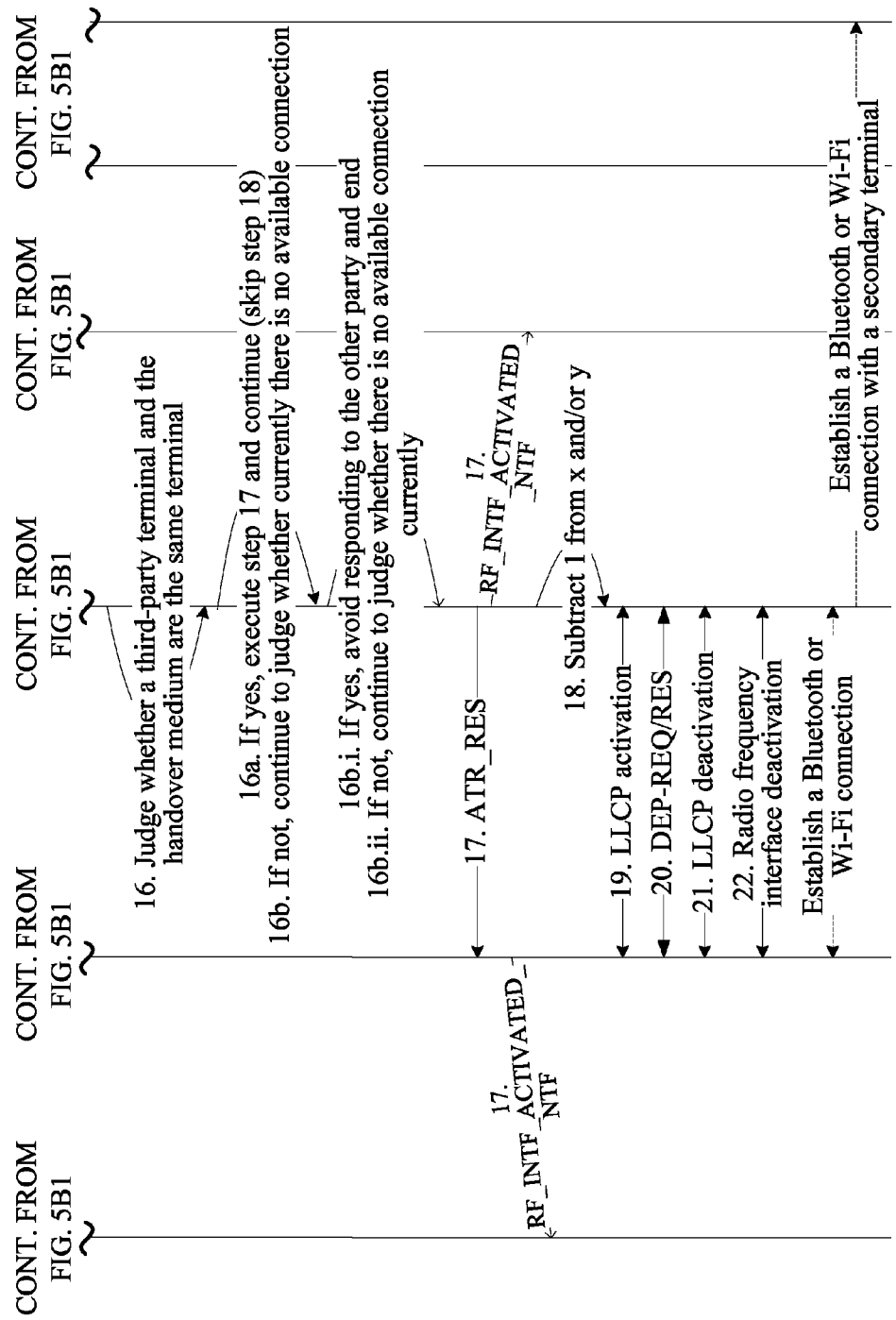
FIG. 5B2

CONNECTION HANDOVER METHOD BASED ON NEAR FIELD COMMUNICATION, AND CORRESPONDING APPARATUS

CROSS-REFERENCE TO RELATED APPLICATIONS

This application is a National Stage of International Patent Application No. PCT/CN2014/073571, filed on Mar. 18, 2014, which claims priority to Chinese Patent Application No. 201310086370.7, filed on Mar. 18, 2013, both of which are hereby incorporated by reference in their entireties.

TECHNICAL FIELD

The present invention relates to the field of communications technologies, and in particular, to a connection handover method based on near field communication and a corresponding apparatus.

BACKGROUND

Near field communication (NFC, Near Field Communication) is a short-range wireless connection technology, in which based on a radio frequency identification (RFID, Radio Frequency Identification) technology, electromagnetic induction is used to implement communication between electronic devices at a short distance. A user only needs a tap (Tap) or devices in close proximity to implement intuitive, secure, and noncontact information exchange, payment transactions, and the like.

A point-to-point (P2P) working mode is a major bidirectional interaction protocol defined in NFC standards. A major protocol used to establish a link at a data link layer between two NFC terminals in an interaction process in the working mode is the Logical Link Control Protocol (Logical Link Control Protocol, LLCP). With the development of the NFC standards, at present, a division manner is proposed, in which an NFC controller (NFC controller, NFCC) is fully responsible for work of the LLCP protocol, whereas a device host (Device Host, DH) is responsible for interaction of application layer data on the LLCP. A method in which a DH configures an NFCC is also specifically defined in NCI specifications.

For two NFC terminals, if the two NFC terminals have a matching carrier (that is, the two NFC terminals support at least one same type of carriers, for example, Bluetooth or Wi-Fi at the same time), by means of a simple tap, the two NFC terminals may exchange Bluetooth and/or Wi-Fi connection configuration information by means of NFC communication in a P2P working mode, so as to rapidly establish a Bluetooth or Wi-Fi connection between the terminals. Such a technology of exchanging connection configuration information by means of NFC communication and rapidly establishing a second type of connection (for example, a Bluetooth connection or Wi-Fi connection) is an NFC connection handover technology. In addition, In a case in which it is inconvenient for two NFC terminals to directly tap each other or get into proximity to each other to implement a connection handover, the NFC Forum proposes, in Connection Handover 1.3 Draft, a method in which a mobile NFC terminal (for example, a mobile phone, or a tablet computer) serves as a handover medium to assist the two terminals in implementing a connection handover to establish a Bluetooth or Wi-Fi connection.

In the prior art, according to Connection Handover 1.3 Draft, for two NFC terminals, when one terminal (serving as a connection handover requester or a handover medium) initiates NFC communication to the other terminal to request a connection handover, unless the other terminal does not have a carrier matching that of the terminal or does not support any carrier, the other terminal feeds back connection configuration information of a corresponding (that is: a matching or supportable) carrier to the terminal, so as to trigger a processing process in which a Bluetooth and/or Wi-Fi module establishes a connection.

The prior art has the following problems: When the other terminal no longer has a connection resource that can be used for establishing a connection, the other terminal still feeds back connection configuration information of the other terminal to the terminal, and triggers the Bluetooth and/or Wi-Fi module to attempt to establish a wireless connection (in this case, even if the Bluetooth and/or Wi-Fi module is triggered, the two terminals still cannot successfully establish a connection), resulting in low communication efficiency; it cannot be ensured that a connection resource that can be used for establishing a connection exists when a connection handover selector feeds back connection configuration information of the connection handover selector; and user experience is poor.

SUMMARY

A technical problem to be solved by embodiments of the present invention is to provide a connection handover method based on near field communication, and a corresponding apparatus, so as to solve the following technical problems in the prior art: it cannot be ensured that a connection resource that can be used for establishing a connection exists when a connection handover selector feeds back connection configuration information of the connection handover selector; communication efficiency is low; and user experience is poor, where these problems are caused by the fact that an NFC terminal cannot properly control whether to feed back connection configuration information of the NFC terminal to another terminal.

To solve the foregoing technical problems, according to a first aspect, a connection handover method based on near field communication is provided, including:

acquiring, by a zeroth terminal, idle connection resource information of the zeroth terminal;

receiving a request message sent by a first terminal, the request message is used for initiating a connection handover process, or used for notifying the zeroth terminal that a connection handover process needs to be performed; and determining, according to the request message, that the following first determining needs to be performed:

determining, according to the idle connection resource information of the zeroth terminal, whether the zeroth terminal has an idle connection resource, if yes, sending a response message to the first terminal, so as to feed back connection configuration information of the zeroth terminal to the first terminal, and if not, skipping feeding back connection configuration information of the zeroth terminal to the first terminal.

According to a second aspect, a connection handover apparatus for near field communication is provided, including:

an acquiring unit, configured to acquire idle connection resource information of a zeroth terminal;

a first receiving unit, configured to receive a request message sent by a first terminal, where the request message is used for initiating a connection handover process, or used for notifying the zeroth terminal that a connection handover process needs to be performed;

a first determining unit, configured to determine, according to the request message, that a first judging unit needs to be triggered;

the first judging unit, configured to determine, according to the idle connection resource information of the zeroth terminal, whether the zeroth terminal has an idle connection resource, and if yes, trigger a first sending unit, where if not, the connection handover apparatus does not feed back connection configuration information of the zeroth terminal to the first terminal; and the first sending unit, configured to send a response message to the first terminal, so as to feed back the connection configuration information of the zeroth terminal to the first terminal.

According to a third aspect, a connection handover apparatus for near field communication is provided, including:

a sending unit, configured to send a request message to a zeroth terminal, where the request message is used for initiating a connection handover process, or used for notifying the zeroth terminal that a connection handover process needs to be performed, where the request message carries a terminal identifier, and the terminal identifier is used for identifying a sender of the request message, so that the zeroth terminal identifies the sender of the request message according to the terminal identifier.

The implementation of the embodiments of the present invention has the following beneficial effects:

1) A zeroth terminal determines, according to an idle connection resource of the zeroth terminal, whether to feed back connection configuration information of the zeroth terminal to a first terminal, so as to ensure that the zeroth terminal has an idle connection resource when the zeroth terminal feeds back the connection configuration information of the zeroth terminal to the first terminal. In a case in which the zeroth terminal has no idle connection resource before receiving a request message of the first terminal, the zeroth terminal may directly determine, according to current idle connection resource information of the zeroth terminal, not to feed back the connection configuration information of the zeroth terminal to the first terminal, so that processing of attempting to establish a connection by a Bluetooth module and/or a Wi-Fi module of the zeroth terminal is not triggered, thereby improving communication efficiency.

2) By performing an operation of reserving a connection resource, it is ensured that a zeroth terminal can successfully establish a connection with a first terminal (or with the second terminal with the assistance of the first terminal). For example, when the zeroth terminal has only one idle connection resource, before the zeroth terminal establishes a connection with the second terminal with the assistance of the first terminal, the only idle connection resource is reserved for the second terminal, thereby preventing another terminal from occupying the only idle connection resource.

3) In NFC communication, a zeroth terminal directly determines, according to idle connection resource information of the zeroth terminal, whether to perform a connection handover process. For example, when the zeroth terminal has no idle connection resource, the zeroth terminal may directly determine not to respond to a device activation request sent by a first terminal or a third terminal, so that subsequent processes such as LLCP activation and data exchange are not executed, that is, an NFC communication procedure is terminated in advance, and therefore, connection configuration information is not fed back, and a process, for example, in which a Bluetooth module and/or a Wi-Fi module of the zeroth terminal attempts to establish a connection is avoided, thereby greatly saving communication time, and improving communication efficiency.

4) User experience is improved.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 5A1, FIG. 5A2, FIG. 5B1, and FIG. 5B2 are a schematic flowchart of a connection handover method based on near field communication according to an embodiment of the present invention;

DESCRIPTION OF EMBODIMENTS

Figure 1:
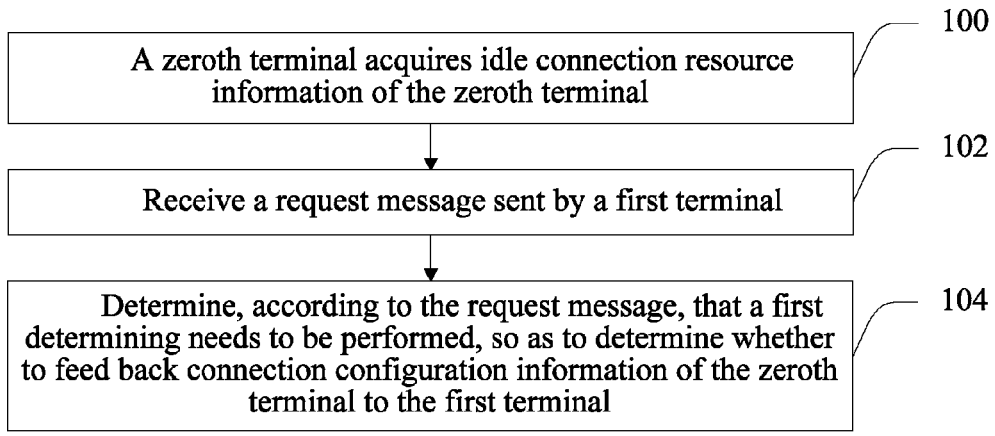
FIG. 1 is a schematic flowchart of a connection handover method based on near field communication according to an embodiment of the present invention.

First, some of the technical terms involved in the present invention are explained as follows:

NFC working mode: a card emulation mode (an NFC terminal emulates a card that meets NFC standards, and is read by another NFC reading device), a point-to-point mode (two peer NFC devices perform bidirectional information interaction in a case in which NFC standards are met), and a card reader mode (an NFC terminal serves as a card reader to read information in another card that meets NFC standards).

NFC connection handover (NFC Connection Handover): an application technology based on NFC. For a terminal that supports NFC and supports Bluetooth and/or Wi-Fi, NFC may be used to exchange Bluetooth and/or Wi-Fi connection configuration information of the device to rapidly establish a Bluetooth connection or a Wi-Fi connection between terminals. Such a technology in which NFC is used to exchange configuration information and establish a second type of connection is an NFC connection handover.

Connection handover requester (Handover Requester): a terminal that initiates an NFC connection handover. In a procedure of a connection handover, a connection handover requester actively sends Bluetooth and/or Wi-Fi connection configuration information of the connection handover requester to a peer end, so that the peer end makes a selection and establishes a connection.

Connection handover selector (Handover Selector): a terminal that accepts a connection handover. In a procedure of a connection handover, after receiving connection configuration information sent by a connection handover requester, a connection handover selector may select one connection manner and establish a connection, or may send connection configuration information supported by the connection handover selector to the connection handover requester as a response.

Alternative carrier (Alternative Carrier): a wireless communication technology that can be used to perform data exchange between a connection handover requester and a connection handover selector.

NFC data exchange format record (NFC Data Exchange Format record, NDEF record): including a load described by a type, a certain length, and one optional identifier descriptor.

Device host (Device Host, DH): responsible for management of a running environment for an NFC device and a peripheral, where the management includes management of an NFC controller peripheral, for example, initialization, configuration, and power management. By using a mobile phone having an NFC function as an example, a DH refers to a CPU of the mobile phone, and needs power supplied by an NFC terminal.

NFC controller (NFC controller, NFCC): a logic entity responsible for transfer of data on an NFC radio frequency interface. By using a mobile phone having an NFC function as an example, an NFCC refers to an NFC chip on the mobile phone. An NFCC in the present invention may work by obtaining, in a passive communication mode, electrical power supplied by a POS device.

NFC control interface (NFC controller Interface, NCI): a logic interface between a DH and an NFCC. An NCI provides the DH with various interfaces for configuring the NFCC.

Logical link control protocol (Logical Link Control Protocol, LLCP): When two NFC terminals work in a point-to-point mode, the protocol provides work such as establishment, activation, deactivation, and management of a data link, and provides support for data transmission at an application layer.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

FIG. 1 is a schematic flowchart of a connection handover method based on near field communication according to an embodiment of the present invention. Referring to FIG. 1, the method includes:

100: A zeroth terminal acquires idle connection resource information of the zeroth terminal.

Optionally, the idle connection resource information of the zeroth terminal includes: information about an unused and unreserved connection resource of the zeroth terminal.

Exemplarily, an NFC chip of the zeroth terminal acquires the idle connection resource information of the zeroth terminal (that is, information about an unused connection resource of the first zeroth terminal, and in this case, because an operation of reserving a connection resource has not been performed, an idle connection resource is an unused connection resource) from a Bluetooth module and/or a Wi-Fi module.

Optionally, the idle connection resource information of the zeroth terminal includes: the number of idle Bluetooth connection resources, and/or, the number of idle Wi-Fi connection resources.

102: Receive a request message sent by a first terminal, where the request message is used for initiating a connection handover process, or used for notifying the zeroth terminal that a connection handover process needs to be performed. The first terminal may serve as a connection handover requester or a handover medium. A person skilled in the art should understand that the zeroth terminal may determine the identity of the first terminal according to carrier content in the request message, and the present invention is not limited thereto.

104: Determine, according to the request message, that the following first determining needs to be performed:

determining, according to the idle connection resource information of the zeroth terminal, whether the zeroth terminal has an idle connection resource, if yes, sending a response message to the first terminal, so as to feed back connection configuration information of the zeroth terminal to the first terminal, and if not, skipping feeding back connection configuration information of the zeroth terminal to the first terminal, where optionally, the connection configuration information of the zeroth terminal includes: Bluetooth connection configuration information, and/or Wi-Fi connection configuration information of the zeroth terminal.

Optionally, when the first terminal is a handover medium, the request message is a connection handover request; the response message is a connection handover medium message including the connection configuration information of the zeroth terminal; and the skipping feeding back connection configuration information of the zeroth terminal to the first terminal includes: sending a connection handover medium message to the first terminal, where the message does not include the connection configuration information of the zeroth terminal. Alternatively, when the first terminal is a handover medium, the request message is a device activation request; the response message is a device activation response; and the skipping feeding back connection configuration information of the zeroth terminal to the first terminal includes: skipping sending the device activation response to the first terminal. For more detailed description, refer to the description in the embodiments shown in FIG. 2A and FIG. 4.

Optionally, when the first terminal is a connection handover requester, the request message is a third connection handover request used for initiating a connection handover process; the response message is a third connection handover selection message including the connection configuration information of the zeroth terminal; and the skipping feeding back connection configuration information of the zeroth terminal to the first terminal includes: sending a connection handover selection message to the first terminal, where the message includes an error code for representing that a connection resource of the zeroth terminal is limited and a cause value. Alternatively, when the first terminal is a connection handover requester, the request message is a third device activation request carrying a third action identifier, so that the zeroth terminal determines, according to the third action identifier, that a connection handover process needs to be performed; the response message is a third device activation response, so as to perform a connection handover process with the first terminal and feed back the connection configuration information of the zeroth terminal to the first terminal in the connection handover process; and the skipping feeding back connection configuration information of the zeroth terminal to the first terminal includes: skipping sending a device activation response to the first terminal. For the description of how to configure the third action identifier and the idle connection resource information of the zeroth terminal, refer to the description below of how to configure the first action identifier and the idle connection resource information of the zeroth terminal.

Optionally, in an implementation manner of this embodiment, if in 104, it is determined that the zeroth terminal has an idle connection resource, not only a response message is sent to the first terminal, an operation of reserving a connection resource is further executed, including:

if the first terminal is a connection handover requester, reserving a connection resource for the first terminal to update the idle connection resource information of the zeroth terminal; and if the first terminal is a handover medium configured to assist the zeroth terminal and the second terminal in establishing a connection, reserving a connection resource for the second terminal to update the idle connection resource information of the zeroth terminal. Exemplarily, an objective of updating an idle connection resource of the zeroth terminal is to: before a connection is established (for example, a communication connection is established) between the zeroth terminal and the first terminal (or between the zeroth terminal and the second terminal with the assistance of the first terminal), and after the zeroth terminal receives the request message sent by a third terminal, determine, according to the idle connection resource information after the zeroth terminal reserves the connection resource, whether to feed back the connection configuration information of the zeroth terminal to the third terminal.

In the method provided in this embodiment, a zeroth terminal determines, according to an idle connection resource of the zeroth terminal, whether to feed back connection configuration information of the zeroth terminal to a first terminal, so as to ensure that the zeroth terminal has an idle connection resource when the zeroth terminal feeds back the connection configuration information of the zeroth terminal to the first terminal. In a case in which the zeroth terminal has no idle connection resource before receiving the request message, the zeroth terminal may directly determine not to feed back connection configuration information of the zeroth terminal to the first terminal, so that processing of attempting to establish a connection by a Bluetooth module and/or a Wi-Fi module of the zeroth terminal is not triggered, thereby improving communication efficiency; and user experience is improved. In addition, if an operation of reserving a connection resource is executed, it can be further ensured that a connection is successfully established between the zeroth terminal and the first terminal (or between the zeroth terminal and the second terminal with the assistance of the first terminal).

In a case in which a handover medium is used to assist two NFCs in performing a connection handover to establish a second connection, considering that it takes time for a user to leave one terminal to reach another terminal, or a user may actively select one carrier according to a condition, which also takes time, it is specified in Connection Handover 1.3 Draft that: after any terminal sends a connection handover medium message, it may be ensured that all carriers in a carrier list of the message are kept in a connectable state for at least 2 minutes. Within this period of time, once a third terminal taps or gets into proximity to a zeroth terminal (the zeroth terminal is an object that the handover medium taps or gets into proximity for the first time) before a connection is established between the zeroth terminal and a second terminal, the third terminal acquires Bluetooth and/or Wi-Fi connection configuration information of the zeroth terminal. When the zeroth terminal currently has only one idle Bluetooth or Wi-Fi connection resource, this connection resource that was supposed to be reserved for the second terminal is occupied first by the third terminal that appears unexpectedly, resulting in a failure of a Bluetooth or Wi-Fi connection between the zeroth terminal and the second terminal. The foregoing problem can be solved based on some embodiments of the present invention, for example, the method embodiments and corresponding apparatus embodiments in the following.

For the foregoing technical problem, in an implementation manner of the embodiment shown in FIG. 1, in a case in which it is determined, according to the idle connection resource information of the zeroth terminal, that the zeroth terminal has an idle connection resource, in addition to the sending a response message to the first terminal, so as to feed back connection configuration information of the zeroth terminal to the first terminal and executing an operation of reserving a connection resource, the method further includes:

receiving, by the zeroth terminal, a request message sent by a third terminal (for example, receives a connection handover request or a device activation request sent by the third terminal) to determine that the following second determining needs to be performed:

determining, according to an idle connection resource after the zeroth terminal reserves the connection resource, whether the zeroth terminal has an idle connection resource (that is, the second determining), if yes, sending a response message to the third terminal to feed back the connection configuration information of the zeroth terminal to the third terminal, and if not, skipping feeding back the connection configuration information of the zeroth terminal to the third terminal.

Figure 2A:
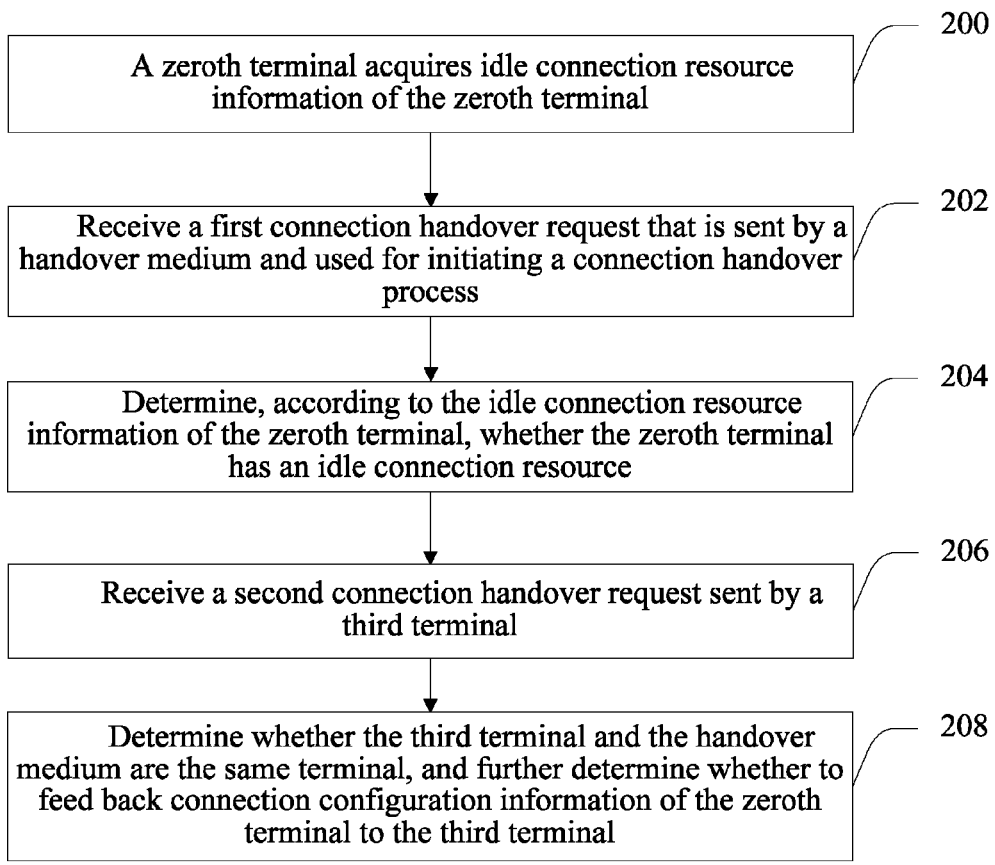
FIG. 2A is a schematic flowchart of a connection handover method based on near field communication according to an embodiment of the present invention.

For more detailed description of this implementation manner, refer to the embodiments shown in FIG. 2A to FIG. 5B2.

FIG. 2A is a schematic flowchart of a connection handover method based on near field communication according to an embodiment of the present invention. Referring to FIG. 2A, the method includes:

200: A zeroth terminal acquires idle connection resource information of the zeroth terminal. Specifically, refer to the foregoing description of step 100. In addition, a time sequence of executing steps 200 and 202 is not limited in this embodiment, for example, step 200 may be executed after step 202 and before step 204.

202: Receive a first connection handover request that is sent by a handover medium (in this case, a first terminal serves as the handover medium, and is configured to assist the zeroth terminal and a second terminal in establishing a connection) and used for initiating a connection handover process, so as to determine that a connection handover needs to be performed, and execute step 204, where the first connection handover request carries a first identifier used for identifying the handover medium.

204: Determine, according to the idle connection resource information of the zeroth terminal, whether the zeroth terminal has an idle connection resource, if yes, send a first connection handover medium message to the handover medium to perform a connection handover process, and reserve a connection resource for the second terminal to update the idle connection resource information of the zeroth terminal, where the first connection handover medium message includes connection configuration information of the zeroth terminal. (If there is no idle connection resource, for the processing manner, refer to the description in the embodiment shown in FIG. 1)

Optionally, the connection configuration information of the zeroth terminal includes: Bluetooth connection configuration information and/or Wi-Fi connection configuration information of the zeroth terminal, or certainly may also include connection configuration information of other connection technologies.

206: After step 204, and before a connection is established between the zeroth terminal and the second terminal, receive a second connection handover request sent by a third terminal, where the second connection handover request carries a second identifier used for identifying the third terminal.

Optionally, the identity of the third terminal includes: a handover medium or a connection handover requester. The zeroth terminal may determine the identity of the third terminal according to carrier content in the second connection handover request message.

208: Determine, according to the second identifier and the first identifier, whether the third terminal and the handover medium are the same terminal, so as to determine whether to feed back the connection configuration information of the zeroth terminal to the third terminal.

Optionally, step 208 includes the following two scenarios:

Scenario 1: When the third terminal and the handover medium are the same terminal, send a second connection handover medium message including the connection configuration information of the zeroth terminal to the third terminal.

Scenario 2: When the third terminal and the handover medium are not the same terminal, determine, according to an idle connection resource after the zeroth terminal reserves the connection resource for the second terminal, whether to feed back the connection configuration information of the zeroth terminal to the third terminal.

Further optionally, in scenario 2, it is determined, according to the idle connection resource after the zeroth terminal reserves the connection resource for the second terminal, whether the zeroth terminal has an idle connection resource, which includes the following cases:

Case 1: When the zeroth terminal has no idle connection resource, if the third terminal is a connection handover requester, send a first connection handover selection message to the third terminal to indicate that a connection resource of the zeroth terminal is limited (for example, the first connection handover selection message includes an error code used for representing that a connection resource of the zeroth terminal is limited and a cause value); and if the third terminal is a handover medium, send a third connection handover medium message only including a message header and a message trailer to the third terminal, so as to notify the third terminal that the zeroth terminal has no idle connection resource that is usable.

In the foregoing case 1, when it is determined that the zeroth terminal has no idle connection resource, a response message that does not include the connection configuration information of the zeroth terminal is directly fed back, so that a Bluetooth module and/or a Wi-Fi module is not triggered, and a process, for example, in which the Bluetooth module and/or the Wi-Fi module attempts to establish a connection is avoided, thereby improving communication efficiency.

Case 2: In a case in which the zeroth terminal has an idle connection resource, if the third terminal is a connection handover requester, send a second connection handover selection message including the connection configuration information of the zeroth terminal to the third terminal; and if the third terminal is a handover medium, send a fourth connection handover medium message including the connection configuration information of the zeroth terminal to the third terminal. Optionally, in a case in which the zeroth terminal has an idle connection resource, reserve a connection resource for the third terminal, or, if the third terminal is a handover medium, use the method provided in this embodiment to reserve a connection resource for a fourth terminal that establishes a connection with the zeroth terminal by using the third terminal.

In addition to the technical effect when the first terminal serves as a handover medium in the embodiment shown in FIG. 1, the method provided in this embodiment can further: reserve a connection resource for the second terminal to prevent a phenomenon in which a connection resource is undesirably occupied, so as to ensure that a connection is successfully established between the zeroth terminal and the second terminal; identify and distinguish the third terminal and a handover medium according to terminal identifiers (for example, the first identifier and the second identifier), so as to prevent connection resources from being repeatedly reserved for the second terminal when the third terminal is the handover medium that sends the first connection handover request; and determine, according to the identity of the third terminal and idle connection resource information after the zeroth terminal reserves the connection resource for the second terminal, whether to further reserve a connection resource, so as to prevent a phenomenon in which a connection resource is undesirably occupied when a connection is established between the zeroth terminal and the third terminal (or a connection is established between the zeroth terminal and another terminal by using the third terminal).

Figure 3A:
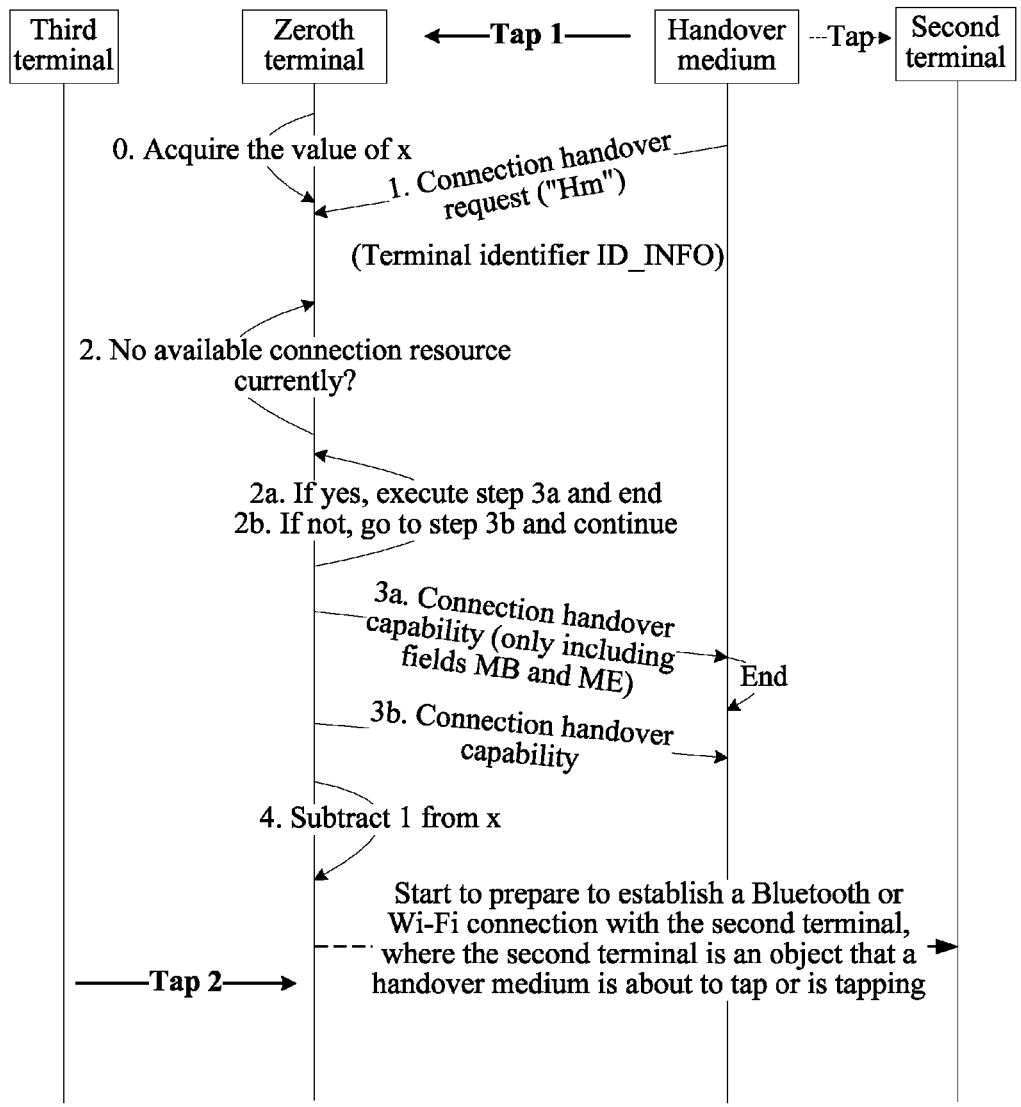
FIG. 3A and FIG. 3B are a schematic flowchart of a connection handover method based on near field communication according to an embodiment of the present invention.
Figure 3B:
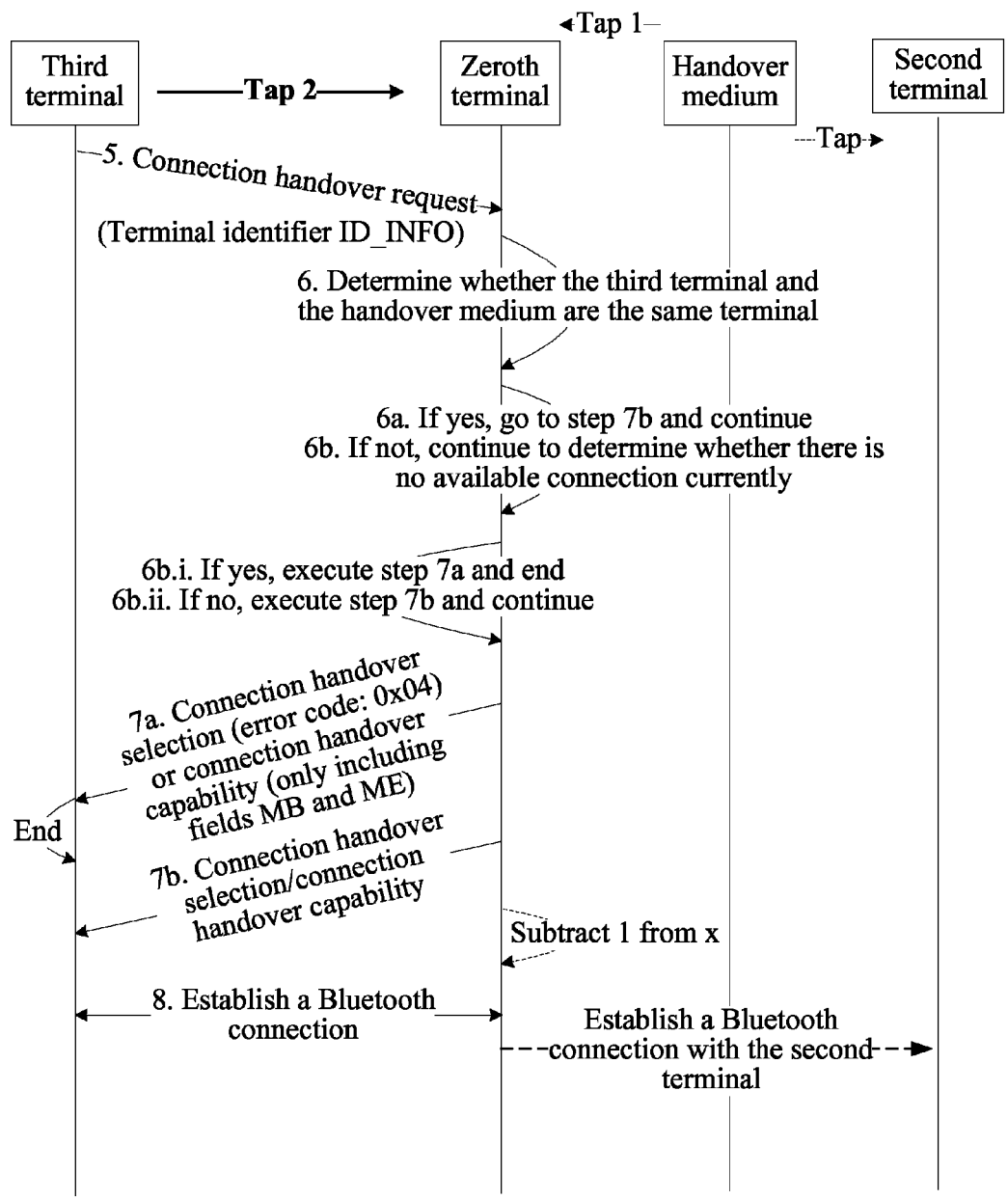

FIG. 3A and FIG. 3B are a schematic flowchart of a connection handover method based on near field communication according to an embodiment of the present invention. The entire procedure includes processes of a first tap (Tap1) and a second tap (Tap2).

FIG. 3A shows the process of the first tap, in which a zeroth terminal and a handover medium perform communication in a P2P working mode, and the handover medium is configured to assist the zeroth terminal and a second terminal in establishing a connection, including:

Step 0: The zeroth terminal acquires the value of current idle connection resource information x, where x represents the number of currently idle Bluetooth connection resources (optionally, the value of the number y of currently idle Wi-Fi connection resources may also be acquired. In this embodiment, the description is provided by using an example in which a first terminal, a second terminal, and a third terminal all support a Bluetooth connection only, and a person skilled in the art should understand that this embodiment is also applicable to a scenario in which each terminal supports Bluetooth and/or Wi-Fi).

Optionally, step 0 may also be executed after step 1 and before step 2.

Step 1: The handover medium (in this case, the first terminal serves as the handover medium) sends a connection handover request message (where a carrier type is "Hm", indicating that the other party is a handover medium rather than a handover requester), where the connection handover request message includes identifier information ID_INFO of the handover medium.

Step 2: The zeroth terminal judges whether currently there is no idle connection resource, that is, whether x≤0.

2a. If yes, execute step 3a and end the entire procedure.
2b. If not, execute step 3b and subsequent steps.

Step 3a: The zeroth terminal feeds back a connection handover medium message to the handover medium, where the connection handover medium message only has a message header MB field and a message trailer ME field.

Step 3b: The zeroth terminal feeds back a connection handover medium message to the handover medium, where the connection handover medium message includes Bluetooth connection configuration information of the zeroth terminal.

Step 4: Subtract 1 from x, so as to reserve a connection resource between the zeroth terminal and the second terminal. The second terminal is an object that a handover medium is about to tap or is tapping.

Subsequently, the zeroth terminal may prepare to establish a Bluetooth connection with the second terminal. Before a Bluetooth connection is established between the zeroth terminal and the second terminal, if the zeroth terminal receives a connection handover request sent by the third terminal, the processing procedure is shown in FIG. 3B, and includes:

Step 5: The third terminal sends a connection handover request to the zeroth terminal, where the connection handover request includes identifier information ID_INFO of the third terminal.

Step 6: The zeroth terminal judges whether the third terminal and the handover medium are the same terminal, that is, whether ID_INFO in step 1 and ID_INFO in step 5 are same.

6a. If yes, execute step 7b and step 8.
6b. If not, determine whether the zeroth terminal currently has no idle connection resource, that is, whether x≤0.
6b.i. If yes, execute step 7a and end the entire procedure.
6b.ii. If not, execute step 7b and step 8.

Step 7a: According to the identity of the third terminal, the zeroth terminal sends a connection handover selection message (when the third terminal serves as a connection handover requester) or a connection handover medium message (when the third terminal serves as a handover medium) to the third terminal. The connection handover selection message includes an error code 0x04 and a corresponding error cause to represent that a connection resource of the zeroth terminal is limited. The connection handover medium message only includes a message header MB field and a message trailer ME field but does not include any connection configuration information.

Step 7b: According to the identity of the third terminal, the zeroth terminal transmits a connection handover medium message or a connection handover selection message to the third terminal.

When the third terminal and the handover medium are the same terminal, the zeroth terminal resends, to the other party, the connection handover medium message sent in step 3b (in this case, it is unnecessary to subtract 1 from x).

When the third terminal and the handover medium are not the same terminal, the zeroth terminal sends the connection handover selection message (when the third terminal serves as a connection handover requester) or the connection handover medium message (when the third terminal serves as a handover medium) to the third terminal. The connection handover selection message and the connection handover medium message include Bluetooth connection configuration information of the zeroth terminal. When the third terminal and the handover medium are not the same terminal, 1 is subtracted from x to update the value of x.

Step 8: The third terminal and the zeroth terminal establish a Bluetooth connection.

In this embodiment, a zeroth terminal acquires the number x of idle Bluetooth connection resources of the zeroth terminal, and a connection resource for establishing a connection between the zeroth terminal and another device is reserved by controlling the value of x, so as to prevent a case in which, when the zeroth terminal has only one idle connection resource and the zeroth terminal has already fed back connection configuration information to a handover medium (the handover medium is configured to assist the zeroth terminal and a second terminal in establishing a connection), the only idle connection resource is occupied first by a third terminal, thereby ensuring that a connection is successfully established between the zeroth terminal and the second terminal, and enhancing user experience.

In addition, a zeroth terminal directly performs determining on an idle connection resource according to the value of x, and when the zeroth terminal has no idle connection resource, the zeroth terminal determines not to feed back the connection configuration information and does not trigger a Bluetooth module, thereby avoiding a process, for example, in which the Bluetooth module attempts to establish a wireless connection, and improving communication efficiency.

A first connection handover request message and a second connection handover request message (for ease of description, generally referred to as a connection handover request message) involved in the embodiments shown in FIG. 1 and FIG. 2A are exemplarily described below.

A terminal identifier ID_INFO (a first identifier and a second identifier are both terminal identifiers) is a parameter newly added to an auxiliary data field pointed to by an auxiliary data pointer in an ac record(s) (ac record(s)), the auxiliary data field is located in a load of an NDEF record, the size of the parameter is 1 octet (octet), and the format definition of the parameter is shown in Table 1:

TABLE 1

Format of ID_INFO

| ID_INFO | | | | | | | | Description The first octet located in an |
|---|---|---|---|---|---|---|---|---|
| b7 | b6 | b5 | b4 | b3 | b2 | b1 | b0 | auxiliary data field |
| x | x | x | x | x | x | x | x | Random numbers that can be maintained at least 2 minutes, used |

TABLE 1-continued

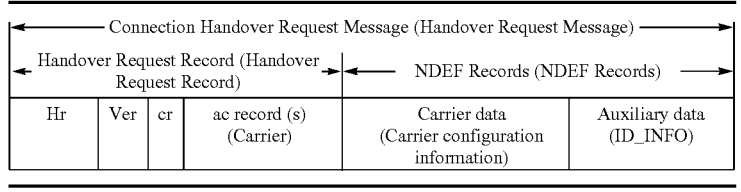

The position of the parameter ID_INFO in a connection handover request message is shown in Table 2:

TABLE 2

| Connection Handover Request Message (Handover Request Message) | | | | | |
|---|---|---|---|---|---|
| Handover Request Record (Handover Request Record) | | | | NDEF Records (NDEF Records) | |
| Hr | Ver | cr | ac record (s) (Carrier) | Carrier data (Carrier configuration information) | Auxiliary data (ID_INFO) |

Figure 2B:
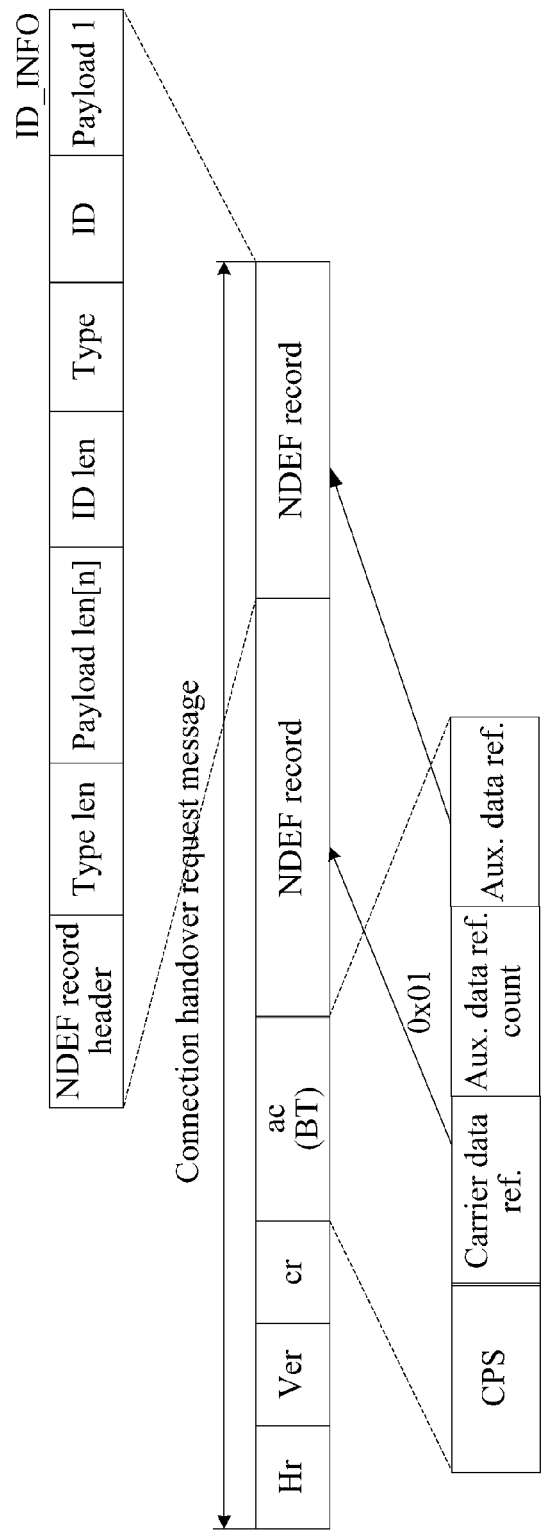
FIG. 2B is a schematic view of a format of a connection handover request message according to an embodiment of the present invention.

For example, if the third terminal only supports a Bluetooth connection, the format of the connection handover request message of the third terminal is shown in FIG. 2B.

ID_INFO is placed in the second NDEF record pointed to by an attached data pointer (more specifically, ID_INFO is placed in the field Payload 1). Refer to the prior art for the detailed description of other fields, which are not limited and described in the present invention.

A first connection handover selection message involved in the embodiments shown in FIG. 1 and FIG. 2A is exemplarily described below. The format of the first connection handover selection message is shown in Table 3:

TABLE 3

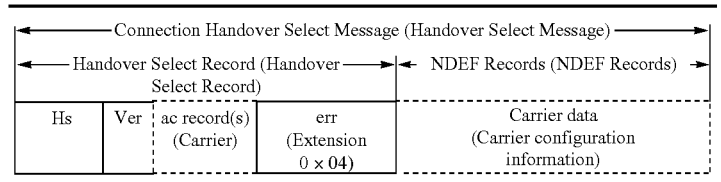

The fields represented by the dotted boxes are omitted in some cases. For example, when a connection handover selector and a connection handover requester do not have matching carriers, a connection handover selection message that is fed back does not include the fields represented by two dotted boxes.

When the third terminal serves as a connection handover requester to tap or get into proximity to the zeroth terminal, if the zeroth terminal has no idle connection resource except a reserved connection resource, the zeroth terminal needs to feed back an error code and a cause to the third terminal, where the error code and the cause are defined as follows:

Error cause value:

| Error cause value | Error data field content |
|---|---|
| 0x04 | Bluetooth or Wi-Fi connection resource is limited |

Error data field content:

| Value | Description |
|---|---|
| 0x04 | An 8-bit unsigned integer used for representing a shortest time interval for resending a connection handover request to a peer terminal, and the value specifically depends on the time of keeping a connectable state of a carrier of a peer terminal as specified in Connection Handover 1.3 Draft. |

Figure 4:
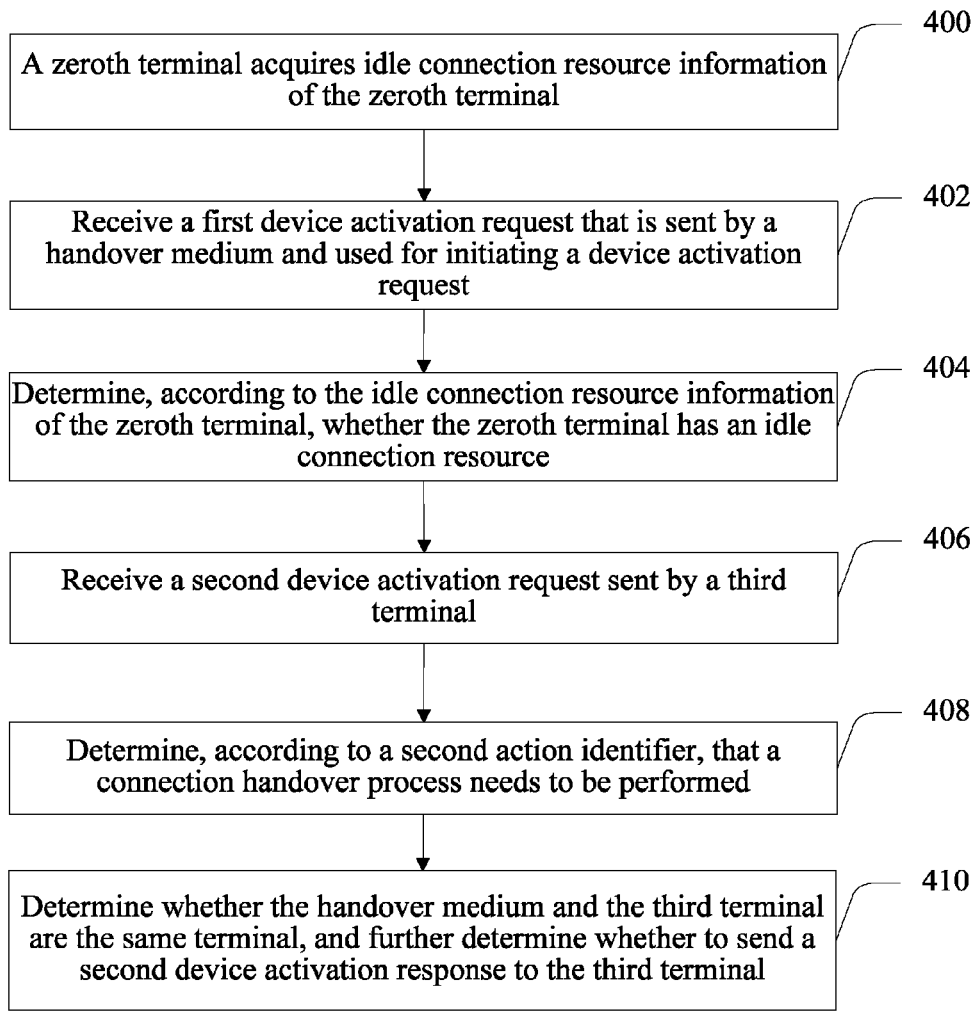
FIG. 4 is a schematic flowchart of a connection handover method based on near field communication according to an embodiment of the present invention.

FIG. 4 is a schematic flowchart of a connection handover method based on near field communication according to an embodiment of the present invention. Referring to FIG. 4, the method includes:

400: A zeroth terminal acquires idle connection resource information of the zeroth terminal. For details, refer to the description about 200 in the foregoing.

Optionally, step 400 includes: a device host DH of the zeroth terminal configures the idle connection resource information of the zeroth terminal for a near field communication controller NFCC of the zeroth terminal, so that in step 404, the NFCC of the zeroth terminal determines, according to the idle connection resource information of the zeroth terminal, whether the zeroth terminal has an idle connection resource. Further optionally, the NFCC of the zeroth terminal updates the idle connection resource information of the zeroth terminal.

402: Receive a first device activation request that is sent by a handover medium (in this case, a first terminal serves as a handover medium, and is configured to assist the zeroth terminal and a second terminal in establishing a connection) and is used for initiating a device activation request, where the first device activation request carries a first action identifier and a third identifier that is used for identifying the handover medium, so that the zeroth terminal determines, according to the first action identifier, that a connection handover process needs to be performed, so as to determine to execute 404. Certainly, it may also be directly determined, according to the first action identifier, that 404 needs to be executed.

Optionally, the handover medium configures the first action identifier and the third identifier for an NFCC of the handover medium by using a DH, so as to send the first device activation request by using the NFCC of the handover medium.

404: Determine, according to the idle connection resource information of the zeroth terminal, whether the zeroth terminal has an idle connection resource, and if yes, send a first device activation response to the handover medium (so as to perform a connection handover process with the first terminal and feed back connection configuration information of the zeroth terminal to the first terminal in the connection handover process. The connection handover process in this case includes processes such as radio frequency interface activation, LLCP activation, and data exchange, and feedback of the connection configuration information is performed in the data exchange process), and reserve a connection resource for the second terminal to update the idle connection resource information of the zeroth terminal. (If there is no idle connection resource, for the processing manner, refer to the description in the embodiment shown in FIG. 1)

406: After step 404, and before a connection is established between the zeroth terminal and the second terminal, receive a second device activation request sent by a third terminal, where the second device activation request carries a second action identifier and a fourth identifier that is used for identifying the third terminal.

Optionally, the identity of the third terminal includes: a handover medium or a connection handover requester.

Optionally, the third terminal configures the second action identifier and the fourth identifier for an NFCC of the third terminal by using a DH, so as to send the second device activation request by using the NFCC of the third terminal.

408: If it is determined, according to the second action identifier, that a connection handover process needs to be performed, determine to execute step 410.

410: Determine, according to the fourth identifier and the third identifier, whether the third terminal and the handover medium are the same terminal, so as to determine whether to send a second device activation response to the third terminal.

Optionally, step 410 includes two scenarios:

Scenario 1: The third terminal and the handover medium are the same terminal; in this case, send the second device activation response, so as to perform a connection handover process with the third terminal and feed back the connection configuration information of the zeroth terminal to the third terminal in the connection handover process.

Optionally, the second device activation response is sent by using an NFCC of the zeroth terminal.

Scenario 2: The third terminal and the handover medium are not the same terminal; in this case, perform determining according to an idle connection resource after the zeroth terminal reserves the connection resource for the second terminal, to determine whether the zeroth terminal has an idle connection resource, and if yes, send the second device activation response, otherwise, skip sending the second device activation response.

Further optionally, in scenario 2, if an idle connection resource exists, the zeroth terminal reserves a connection resource for the third terminal, or, when the third terminal is a handover medium, the zeroth terminal reserves a connection resource for a fourth terminal that establishes a connection with the zeroth terminal by using the third terminal, so as to avoid a possible problem that a resource is undesirably occupied.

In addition to the technical effect in the embodiment shown in FIG. 2A, the method provided in this embodiment can further directly determine, when a zeroth terminal has no idle connection resource, not to respond to a device activation request sent by a handover medium or a third terminal, so that subsequent processes such as LLCP activation and data exchange are not executed, that is, an NFC communication procedure is terminated in advance, and therefore, connection configuration information is fed back, and a process, for example, in which a Bluetooth module and/or a Wi-Fi module of the zeroth terminal attempts to establish a connection is avoided, thereby greatly saving communication time, and improving communication efficiency.

FIG. 5A1, FIG. 5A2, FIG. 5B1, and FIG. 5B2 are a schematic flowchart of a connection handover method based on near field communication according to an embodiment of the present invention. The entire procedure includes processes of a first tap (Tap1) and a second tap (Tap2).

Referring to FIG. 5A1 and FIG. 5A2, FIG. 5A1 and FIG. 5A2 are the process of the first tap, in which a zeroth terminal and a handover medium (which is configured to assist the zeroth terminal and a second terminal in establishing a connection) perform communication by using a P2P working mode, including (assuming that the zeroth terminal and a third terminal both support a Bluetooth module and a Wi-Fi module):

Step 0: A DH of the zeroth terminal acquires the values of current idle connection resource information x and y, where x represents the number of currently idle Bluetooth connection resources, and y represents the number of currently idle Wi-Fi connection resources.

Step 1: Parameter configuration process

The DH of the zeroth terminal configures current idle Bluetooth connection resource information HO_BT_CONN_INFO and/or Wi-Fi connection resource information HO_WIFI_CONN_INFO for an NFCC of the zeroth terminal by using a CORE_SET_CONFIG_CMD command (operations of updating HO_BT_CONN_INFO and HO_WIFI_CONN_INFO may be executed at the NFCC). A DH of the handover medium configures terminal identifier ID_INFO information and action flag information ACT_FLAG for the NFCC of the handover medium by using a CORE_SET_CONFIG_CMD command.

For the zeroth terminal and the handover medium, after receiving configuration commands and performing configuration successfully, the NFCCs of the zeroth terminal and the handover medium feed back CORE_SET_CONFIG_RSP responses to the DHs, to indicate that the configuration succeeds.

Optionally, step 0 and step 1 are performed after step 4a and before step 5.

Step 2: Radio frequency discovery process

The DH of the handover medium triggers, by using an RF_DISCOVER_CMD command, the NFCC to start a radio frequency discovery process. The NFCC feeds back a response RF_DISCOVER_RSP to the DH, to indicate that the radio frequency discovery process is being performed.

Step 3: The NFCC of the handover medium sends, to the zeroth terminal, a device activation request—ATR_REQ request, where the ATR_REQ request includes the ID_INFO information and ACT_FLAG information.

Step 4: After receiving the ATR_REQ request, the NFCC of the zeroth terminal determines, according to ACT_FLAG in the ATR_REQ request, whether the intention of the other party is a connection handover.

4a. If yes, execute step 5 and continue with the procedure.

4b. If not, execute step 6, then go to step 8, and continue till the procedure of Tap1 ends.

For example, when the intention of the other party is to exchange a business card with the zeroth terminal, the zeroth terminal directly responds to the other party with ATR_RES and performs subsequent data exchange without needing to perform the following operation of subtraction by 1 in step 7.

Step 5: The NFCC of the zeroth terminal determines, according to a current idle connection resource of the zeroth terminal, whether there is no idle connection resource (that is, judges whether x≤0 and y≤0).

Optionally, the zeroth terminal may determine, according to the specification in the existing protocol, whether the zeroth terminal needs to feed back Bluetooth or Wi-Fi connection configuration information, so as to perform determining according to corresponding x or y.

5a. If yes, skip responding to the other party and end the entire procedure.

5b. If not, execute step 6 and continue.

Step 6:

The NFCC of the zeroth terminal feeds back a device activation response—ATR_RES response to the handover medium.

For the zeroth terminal, the NFCC notifies, by using RF_INTF_ACTIVATED_NTF, the DH that radio frequency interface activation is accomplished, where RF_INTF_ACTIVATED_NTF includes received ATR_REQ (including ID_INFO and ACT_FLAG).

For the handover medium, the NFCC notifies, by using RF_INTF_ACTIVATED_NTF, the DH that radio frequency interface activation is accomplished, where RF_INTF_ACTIVATED_NT includes received ATR_RES.

Step 7: Correspondingly perform an operation of subtracting 1 from x or y.

Step 8: LLCP activation process.

Step 9: Data exchange process.

Step 10: LLCP deactivation process.

Step 11: Radio frequency interface deactivation process.

Subsequently, the zeroth terminal may prepare to establish a Bluetooth or Wi-Fi connection with the second terminal. Before a connection is established between the zeroth terminal and the second terminal, if the zeroth terminal receives a connection handover request sent by the third terminal, the processing process is shown in FIG. 5B1 and FIG. 5B2, and includes:

Step 12: Parameter configuration process

A DH of the third terminal configures, by using CORE_SET_CONFIG_CMD, terminal identifier information ID_INFO and action flag information ACT_FLAG of the third terminal for an NFCC of the third terminal.

For the third terminal, after receiving the configuration command and performing configuration successfully, the NFCC of the third terminal feeds back a CORE_SET_CONFIG_RSP response to the DH, to indicate that configuration succeeds.

Step 13: Radio frequency discovery process

The DH of the third terminal triggers, by using an RF_DISCOVER_CMD command, the NFCC to start a radio frequency discovery process. The NFCC feeds back a response RF_DISCOVER_RSP to the DH, to indicate that the radio frequency discovery process is being performed.

Step 14: The third terminal performs determination and sends, by using the NFCC to the zeroth terminal, an ATR_REQ request, where the ATR_REQ request includes the ID_INFO information and the ACT_FLAG information.

Step 15: After receiving the request by using the NFCC, the zeroth terminal determines, according to ACT_FLAG, whether the intention of the other party is a connection handover.

15a. If yes, execute step 16 and continue.

15b. If not, execute step 17, then go to step 19, and continue.

Step 16: The zeroth terminal judges whether the third terminal and the handover medium are the same terminal, that is, whether ID_INFO in step 1 and ID_INFO in step 12 are same.

16a. If yes, execute step 17, then go to step 19, and continue.

16b. If not, continue to determine whether the zeroth terminal currently (after a connection resource is reserved for the second terminal) has no idle connection resource. When the third terminal serves as a handover medium, the zeroth terminal judges whether x≤0 and y≤0; and when the third terminal serves as a connection handover requester, the zeroth terminal may perform determining according to idle connection resource information of a carrier that is supported by both the zeroth terminal and the third terminal.

16b.i. If yes, skip responding to the other party and end the procedure of Tap2.

16b.ii. If not, execute step 17 and continue.

Step 17:

The zeroth terminal feeds back a device activation response—ATR_RES response to the third terminal by using the NFCC.

For the zeroth terminal, the NFCC notifies, by using RF_INTF_ACTIVATED_NTF, the DH that radio frequency interface activation is accomplished, where RF_INTF_ACTIVATED_NTF includes received ATR_REQ (including ID_INFO and ACT_FLAG).

For the third terminal, the NFCC notifies, by using RF_INTF_ACTIVATED_NTF, the DH that radio frequency interface activation is accomplished, where RF_INTF_ACTIVATED_NTF includes received ATR_RES.

Step 18 to step 22 are the same as step 7 to step 11 in FIG. 5A1 and FIG. 5A2.

In addition to the technical effect in the embodiment shown in FIG. 3A and FIG. 3B, the method provided in this embodiment can further terminate an NFC communication procedure in advance (the principle is the same as that in the embodiment shown in FIG. 4) by controlling the value of x and/or y when a zeroth terminal has no idle connection resource, thereby preventing a process in which a Bluetooth module and/or a Wi-Fi module attempts to establish a wireless connection, greatly saving communication time, and improving communication efficiency.

In FIG. 2A to FIG. 5B2, a case in which a first terminal serves as the terminal medium is described, and a person skilled in the art should understand that In a case in which the first terminal serves as a connection handover requester, the processing idea provided in the foregoing embodiments is also applicable and corresponding technical effects can be achieved, and the case is not described herein again.

Some parameters and messages in the embodiments shown in FIG. 1, FIG. 4, FIG. 5A1, FIG. 5A2, FIG. 5B1, and FIG. 5B2 are exemplarily described below.

The parameters added in the embodiments shown in FIG. 1, FIG. 4, FIG. 5A1, FIG. 5A2, FIG. 5B1, and FIG. 5B2 include: current idle connection resource information HO_BT_CONN_INFO (Bluetooth connection resource information) and/or HO_WIFI_CONN_INFO (Wi-Fi connection resource information), terminal identifier (for example, first identifier, second identifier) information ID_INFO, and action identifier (for example, first action identifier) information ACT_FLAG. HO_BT_CONN_INFO and/or HO_WIFI_CONN_INFO only needs to be transmitted between a DH and an NFCC of a zeroth terminal, whereas ID_INFO and ACT_FLAG need to be configured by the DH for the NFCC and then transferred to a peer terminal by using a device activation request ATR_REQ. Examples of extension manners of the parameters are as follows:

1: An extension manner of HO_BT_CONN_INFO and HO_WIFI_CONN_INFO:

Select 0x83 from reserved fields 0x83-0x9F in Other Parameters (other parameters) in the command CORE_SET_CONFIG_CMD used to set the configuration parameters, to extend HO_BT_CONN_INFO, and select 0x84 to extend HO_WIFI_CONN_INFO. The specific extension manner of the two parameters and the meanings of the values are shown in Table 4 to Table 7:

TABLE 4

(Configuration parameter tag)

| Parameter name | Tag |
|---|---|
| Other Parameters (other parameters) | |
| HO_BT_CONN_INFO | 0x83 |
| HO_WIFI_CONN_INFO | 0x84 |

TABLE 5

(Discovery configuration parameter)

| ID | Length | Value | Description |
|---|---|---|---|
| HO_BT_CONN_INFO | 1 octet | Refer to Table 6 for details | For describing the maximum value of the number of currently idle Bluetooth connection resources |
| HO_WIFI_CONN_INFO | 1 octet | Refer to Table 7 for details | For describing the maximum value of the number of currently idle Wi-Fi connection resources |

TABLE 6

Values of HO_BT_CONN_INFO and meanings

| HO_BT_CONN_INFO | | | | | | | | Description |
|---|---|---|---|---|---|---|---|---|
| b7 | b6 | b5 | b4 | b3 | b2 | b1 | b0 | |
| 0 | 0 | | | | | | | RFU |
| | | x | x | x | x | x | x | The value represents the maximum value of the number of currently idle Bluetooth connection resources |

TABLE 7

Values HO_WIFI_CONN_INFO and meanings

| HO_WIFI_CONN_INFO | | | | | | | | Description |
|---|---|---|---|---|---|---|---|---|
| b7 | b6 | b5 | b4 | b3 | b2 | b1 | b0 | |
| 0 | 0 | | | | | | | RFU |
| | | x | x | x | x | x | x | The value represents the maximum value of the number of currently idle Wi-Fi connection resources |

2: Several extension manners of ID_INFO and ACT_FLAG are as follows:

a) Reserved bits b7 and b6 of an NFC-DEP discovery parameter PN_ATR_REQ_CONFIG in a poll (Poll) mode are used to control the reserved bits b8 and b7 of $PP_I$ in ATR_REQ, so as to extend ID_INFO and ACT_FLAG. The extension manners of the two parameters are shown in Table 8 to Table 10.

TABLE 8

Values of PN_ATR_REQ_CONFIG

| | Bit mask (bit mask) | | | | | | | | Description |
|---|---|---|---|---|---|---|---|---|---|
| | b7 | b6 | b5 | b4 | b3 | b2 | b1 | b0 | |
| Octet 0 | 1 | 1 | | | | | | | If the value is set to 11b, it indicates that ID_INFO and ACT_FLAG may be used, otherwise, ID_INFO and ACT_FLAG are not used |
| | | | 0 | | | 0 | 0 | | RFU |
| | | | | x | | | | | If the value is set to 1b, DID may be used, otherwise, DID is not used. Note: For the LLCP, the value needs to be set to 0b |
| | | | | | x | x | | | The value corresponds to $LR_I$ defined in [DIGITAL]. Note: For the LLCP, the value needs to be set to 11b |

TABLE 9

$PP_I$ format

| b8 | b7 | b6 | b5 | b4 | b3 | b2 | b1 | Meaning |
|---|---|---|---|---|---|---|---|---|
| 1 | 1 | | | | | | | If the value is set to 11b, it indicates that a 2-byte INFO_MANAGE field exists in ATR_REQ, otherwise, the field does not exist. The brackets in [INFO_MANAGE] in Table 10 indicates that the field is optional |
| | | x | x | | | | | $LR_I$ |
| | | | | 0 | 0 | | | RFU |
| | | | | | | x | | If the value is set to 1, it indicates that a general byte ($G_I$) may be obtained |
| | | | | | | | x | If the value is set to 1, it indicates that NAD is used |

TABLE 10

Format of ATR_REQ

| Byte 1 | Byte 2 | Byte 3-12 | Byte 13 | Byte 14 | Byte 15 | Byte 16 | [INFO_MANAGE] Byte17 | Byte18 | Byte (byte)19- 19 + n |
|---|---|---|---|---|---|---|---|---|---|
| D4h | 00h | $NFCID3_I$ | $DID_I$ | $BS_I$ | $BR_I$ | $PP_I$ | [ID_INFO] | [ACT_FLAG] | [$G_i0 \ldots G_in$] | b) One NFC-DEP discovery parameter PC_ATR_REQ_HO_MANAGE is added to CORE_SET_CONFIG_CMD in a Poll mode, so as to extend ID_INFO and ACT_FLAG in ATR_REQ. The specific extension manners of the two parameters are shown in Table 11 to Table 14.

TABLE 11

Configuration parameter tag

ID_INFO

| b7 | b6 | b5 | b4 | b3 | b2 | b1 | b0 | Description |
|---|---|---|---|---|---|---|---|---|
| x | x | x | x | x | x | x | x | Random numbers that can be maintained at least 2 minutes, used for representing terminal identifier information |

The specific definition of PN_ATR_REQ_HO_MANAGE is as follows:

TABLE 12

(Discovery configuration parameter of NFC data exchange protocol in Poll mode)

| ID | Length | Value | Description |
|---|---|---|---|
| PN_ATR_REQ_ | 1 octet | Refer to Table 13 | Configuration about a |

TABLE 12-continued (Discovery configuration parameter of NFC data exchange protocol in Poll mode)

| ID | Length | Value | Description |
|---|---|---|---|
| HO_MANAGE | | for details | connection handover, used for a relevant parameter in ATR_REQ. |

TABLE 13

Values of PN_ATR_REQ_HO_MANAGE

Bit mask

| | b7 | b6 | b5 | b4 | b3 | b2 | b1 | b0 | Description |
|---|---|---|---|---|---|---|---|---|---|
| Octet 0 | 0 | 0 | 0 | 0 | 0 | 0 | | | RFU |
| | | | | | | | | x | If the value is set to 1b, terminal identifier information ID_INFO is used, otherwise, terminal identifier information ID_INFO is not used. Note: The value needs to be set to 1 when the terminal needs to perform a connection handover |
| | | | | | | | x | | If the value is set to 1b, action identifier information ACT_FLAG is used, otherwise, action identifier information ACT_FLAG is not used. Note: The value needs to be set to 1 when the terminal needs to perform a connection handover |

The positions of ID_INFO and ACT_FLAG in ATR_REQ are as follows:

TABLE 14

Format of ATR_REQ

| Byte 1 | Byte 2 | Byte 3-12 | Byte 13 | Byte 14 | Byte 15 | Byte 16 | Byte 17 | Byte 18 | Byte 19- 19 + n |
|---|---|---|---|---|---|---|---|---|---|
| D4h | 00h | $NFCID3_I$ | $DID_I$ | $BS_I$ | $BR_I$ | $PP_I$ | ID_INFO | ACT_FLAG | [$G_i0 \ldots G_in$] |

For the foregoing two extension manners a) and b), a same method may be used to define the values of ID_INFO and ACT_FLAG, which are specifically shown in Tables 15 and 16:

TABLE 15

Values of ID_INFO and meanings

| ID_INFO | | | | | | | | Description |
|---|---|---|---|---|---|---|---|---|
| b7 | b6 | b5 | b4 | b3 | b2 | b1 | b0 | |
| x | x | x | x | x | x | x | x | Random numbers that can be maintained at least 2 minutes, used for representing terminal identifier information |

TABLE 16

Values of ACT_FLAG and meanings

| ACT_FLAG | | | | | | | | Description |
|---|---|---|---|---|---|---|---|---|
| b7 | b6 | b5 | b4 | b3 | b2 | b1 | b0 | |
| 0 | 0 | 0 | 0 | 0 | 0 | | | RFU |
| | | | | | | x | x | If the value is set to 11b, it represents an action intention of a connection handover, and all other values represent RFU |

When each table in the specification is described, mainly the differences or improvements in the present invention from the prior art are described, and reference may be made to the prior art for the rest content, which is not limited in the present invention.

Figure 6:
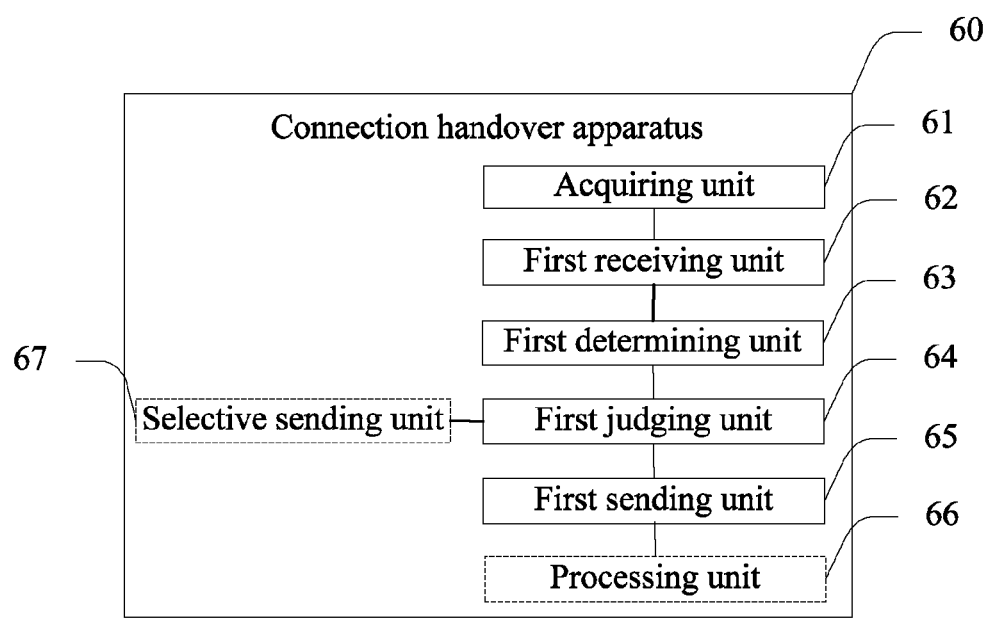
FIG. 6 is a schematic structural diagram of a connection handover apparatus according to an embodiment of the present invention.

FIG. 6 is a schematic structural diagram of a connection handover apparatus according to an embodiment of the present invention. Referring to FIG. 6, a connection handover apparatus 60 includes (a dotted box indicates that a unit/module is optional; the same below):

an acquiring unit 61, configured to acquire idle connection resource information of a zeroth terminal, where, for example, the acquiring unit 61 acquires the idle connection resource information of the zeroth terminal from a Bluetooth module and/or a Wi-Fi module; optionally, the idle connection resource information of the zeroth terminal includes: the number of idle Bluetooth connection resources, and/or, the number of idle Wi-Fi connection resources;

a first receiving unit 62, configured to receive a request message sent by a first terminal, where the request message is used for initiating a connection handover process, or used for notifying the zeroth terminal that a connection handover process needs to be performed; optionally, the first terminal is a connection handover requester or a handover medium;

a first determining unit 63, configured to determine, according to the request message, that a first judging unit 64 needs to be triggered;

the first judging unit 64, configured to determine, according to the idle connection resource information of the zeroth terminal, whether the zeroth terminal has an idle connection resource, and if yes, trigger a first sending unit 65; and the first sending unit 65, configured to send a response message to the first terminal, so as to feed back connection configuration information of the zeroth terminal to the first terminal.

Optionally, when the first terminal serves as a handover medium, the first receiving unit 62 receives a first connection handover request used for initiating a connection handover process. In this case, the first determining unit 63 determines that the first judging unit 64 needs to be triggered. The first sending unit 65 may send a first connection handover medium message including the connection configuration information of the zeroth terminal, where the connection configuration information of the zeroth terminal includes: Bluetooth connection configuration information, and/or Wi-Fi connection configuration information of the zeroth terminal.

Optionally, when the first terminal serves as a handover medium, the first receiving unit 62 receives a first device activation request used for initiating a device activation request, where the first device activation request carries a first action identifier. In this case, the first determining unit 63 determines, according to the first action identifier, that a connection handover process needs to be performed, so as to trigger the first judging unit 64. The first sending unit 65 may send a first device activation response, so as to perform a connection handover process with the first terminal and feed back the connection configuration information of the zeroth terminal to the first terminal in the connection handover process.

Optionally, when the first terminal serves as a connection handover requester, the first receiving unit 62 receives a third connection handover request used for initiating a connection handover process. The first sending unit 65 sends a third connection handover selection message including the connection configuration information of the zeroth terminal (when the first judging unit 64 judges that the zeroth terminal has an idle connection resource), or sends a connection handover selection message representing that a connection resource of the zeroth terminal is limited (when the first judging unit 64 judges that the zeroth terminal has no idle connection resource).

Optionally, when the first terminal serves as a connection handover requester, the acquiring unit 61 includes: a second configuring module, configured to configure the idle connection resource information of the zeroth terminal for an NFCC of the zeroth terminal by using a DH of the zeroth terminal, so that the first judging unit 64 judges whether the zeroth terminal has an idle connection resource. The first receiving unit 62 receives a third device activation request carrying a third action identifier, so that the first determining unit 63 determines, according to the third action identifier, that a connection handover process needs to be performed. The first sending unit 65 sends a third device activation response (when the first judging unit 64 judges that the zeroth terminal has an idle connection resource), so as to perform a connection handover process with the first terminal and feed back connection configuration information of the zeroth terminal to the first terminal in the connection handover process, or, the first sending unit 65 does not send the third device activation response (when the first judging unit 64 judges that the zeroth terminal has no idle connection resource).

Optionally, in an implementation manner of this embodiment, the connection handover apparatus 60 further includes: a selective sending unit 67. If the first judging unit 64 determines, according to the idle connection resource information of the zeroth terminal, that the zeroth terminal has no idle connection resource, the connection handover apparatus 60 does not feed back the connection configuration information of the zeroth terminal to the first terminal. In this case, the selective sending unit 67 may be triggered, so that the selective sending unit 67 determines, according to the request message, whether to send a response message corresponding to the request message. For example, when the request message is a connection handover request and the first terminal serves as a handover medium, the selective sending unit 67 sends a connection handover medium message not including the connection configuration information of the zeroth terminal; when the request message is a connection handover request and the first terminal serves as a connection handover requester, the selective sending unit 67 sends a connection handover selection message representing that a connection resource of the zeroth terminal is limited; when the request message is a device activation request, the selective sending unit 67 determines that it is unnecessary to respond to the device activation request, and does not send a device activation response.

Optionally, in an implementation manner of this embodiment, the apparatus 60 further includes:

a processing unit 66, configured to: in a case in which the first judging unit 64 judges that the zeroth terminal has an idle connection resource, reserve a connection resource to update the idle connection resource information of the zeroth terminal, including: if the first terminal is a connection handover requester, reserve a connection resource for the first terminal; and if the first terminal is a handover medium configured to assist the zeroth terminal and a second terminal in establishing a connection, reserve a connection resource for the second terminal.

The connection handover apparatus 60 provided in this embodiment ensures that a zeroth terminal has an idle connection resource when the zeroth terminal feeds back connection configuration information of the zeroth terminal to the first terminal. In a case in which the zeroth terminal has no idle connection resource before receiving a request message of the first terminal, the zeroth terminal does not feed back connection configuration information of the zeroth terminal, thereby preventing a process in which a Bluetooth module and/or a Wi-Fi module of the zeroth terminal attempts to establish a connection, improving communication efficiency, and enhancing user experience. In addition, if the apparatus 60 includes the first processing module 66, an operation of reserving a connection resource may further be executed, so as to ensure that the zeroth terminal successfully establishes a connection with the first terminal (or with the second terminal with the assistance of the first terminal).

Figure 7:
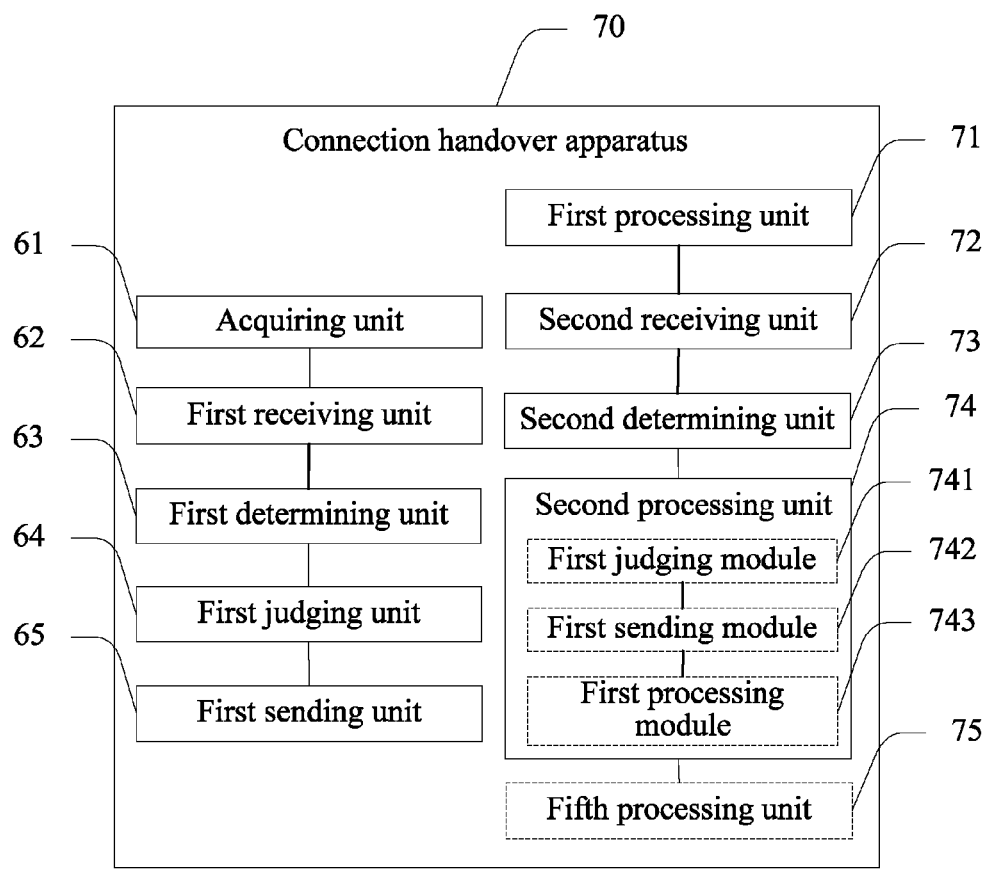
FIG. 7 is a schematic structural diagram of a connection handover apparatus according to an embodiment of the present invention.

FIG. 7 is a schematic structural diagram of a connection handover apparatus according to an embodiment of the present invention. Referring to FIG. 7, a connection handover apparatus 70 includes an acquiring unit 61, a first receiving unit 62, a first determining unit 63, a first judging unit 64, and a first sending unit 65, and further includes a first processing unit 71, a second receiving unit 72, a second determining unit 73, and a second processing unit 74.

For the acquiring unit 61, refer to the description in the embodiment shown in FIG. 6.

The first receiving unit 62 receives a first connection handover request that is sent by a handover medium and is used for initiating a connection handover process (in this case, a first terminal serves as a handover medium, and is configured to assist the zeroth terminal and a second terminal in establishing a connection), where the first connection handover request carries a first identifier used for identifying the handover medium.

The first determining unit 63 determines to trigger the first judging unit 64 after the first receiving unit 62 receives the first connection handover request.

The first judging unit 64 determines, according to the idle connection resource information of the zeroth terminal, that the zeroth terminal has an idle connection resource, and triggers the first sending unit 65 and the first processing unit 71. (In a case in which the zeroth terminal has no idle connection resource, refer to the description in the embodiment shown in FIG. 6)

The first sending unit 65 sends a first connection handover medium message including connection configuration information of the zeroth terminal to the handover medium, where the connection configuration information of the zeroth terminal includes: Bluetooth connection configuration information and/or Wi-Fi connection configuration information of the zeroth terminal.

The first processing unit 71 is configured to reserve a connection resource for the second terminal to update the idle connection resource information of the zeroth terminal.

The second receiving unit 72 is configured to: after the apparatus 70 sends the first connection handover medium message and reserves the connection resource for the second terminal, and before a connection is established between the zeroth terminal and the second terminal, receive a second connection handover request sent by a third terminal, where the second connection handover request carries a second identifier used for identifying the third terminal.

The second determining unit 73 is configured to determine, according to the second connection handover request, to trigger the second processing unit 74.

The second processing unit 74 is configured to determine, according to the second identifier and the first identifier, whether the third terminal and the handover medium are the same terminal, so as to determine whether to feed back the connection configuration information of the zeroth terminal to the third terminal.

Optionally, in an implementation manner of this embodiment, the second processing unit 74 includes:

a first judging module 741, configured to determine, according to the second identifier and the first identifier, whether the third terminal and the handover medium are the same terminal, and if yes, trigger a first sending module 742, otherwise, trigger a first processing module 743;

the first sending module 742, configured to send a second connection handover medium message including the connection configuration information of the zeroth terminal to the third terminal; and the first processing module 743, configured to determine, according to an idle connection resource after the zeroth terminal reserves the connection resource for the second terminal, whether to feed back the connection configuration information of the zeroth terminal to the third terminal.

Further optionally, the first processing module 743 includes:

a first judging submodule, configured to determine, according to the idle connection resource after the zeroth terminal reserves the connection resource for the second terminal, whether the zeroth terminal has an idle connection resource, and when it is determined that there is no idle connection resource, trigger a first sending submodule, otherwise, trigger a second sending submodule.

the first sending submodule, configured to: when the third terminal serves as a connection handover requester, send a first connection handover selection message to the third terminal to indicate that a connection resource of the zeroth terminal is limited; and when the third terminal serves as a handover medium, send a third connection handover medium message only including a message header and a message trailer to the third terminal, where, optionally, the first connection handover selection message includes an error code used for representing that a connection resource of the zeroth terminal is limited and a cause value; and the second sending submodule, configured to: when the third terminal is a connection handover requester, send a second connection handover selection message including the connection configuration information of the zeroth terminal to the third terminal; and when the third terminal is a handover medium, send a fourth connection handover medium message including the connection configuration information of the zeroth terminal to the third terminal.

Optionally, in an implementation manner of this embodiment, the connection handover apparatus 70 further includes:

a fifth processing unit 75, configured to reserve a connection resource for the third terminal. For example, when the third terminal is a connection handover requester, and the zeroth terminal still has an idle connection resource after the zeroth terminal reserves the connection resource for the second terminal, the fifth processing unit 75 is triggered. Certainly, the fifth processing unit 75 may further be configured to: when the third terminal is a handover medium, reserve a connection resource for a fourth terminal that establishes a connection with the zeroth terminal by using the third terminal.

In addition to the technical effect when the first terminal serves as a handover medium in the embodiment shown in FIG. 6, the connection handover apparatus 70 provided in this embodiment can further: reserve a connection resource for the second terminal to prevent a phenomenon in which a connection resource is undesirably occupied, thereby ensuring that the zeroth terminal and the second terminal successfully establish a connection; identify the handover medium and a third terminal to prevent a connection resource from being repeatedly reserved for the second terminal; and prevent a phenomenon in which a connection resource is undesirably occupied when the zeroth terminal establishes a connection with the third terminal (or establishes a connection with another terminal by using the third terminal), thereby improving communication efficiency.

Figure 8:
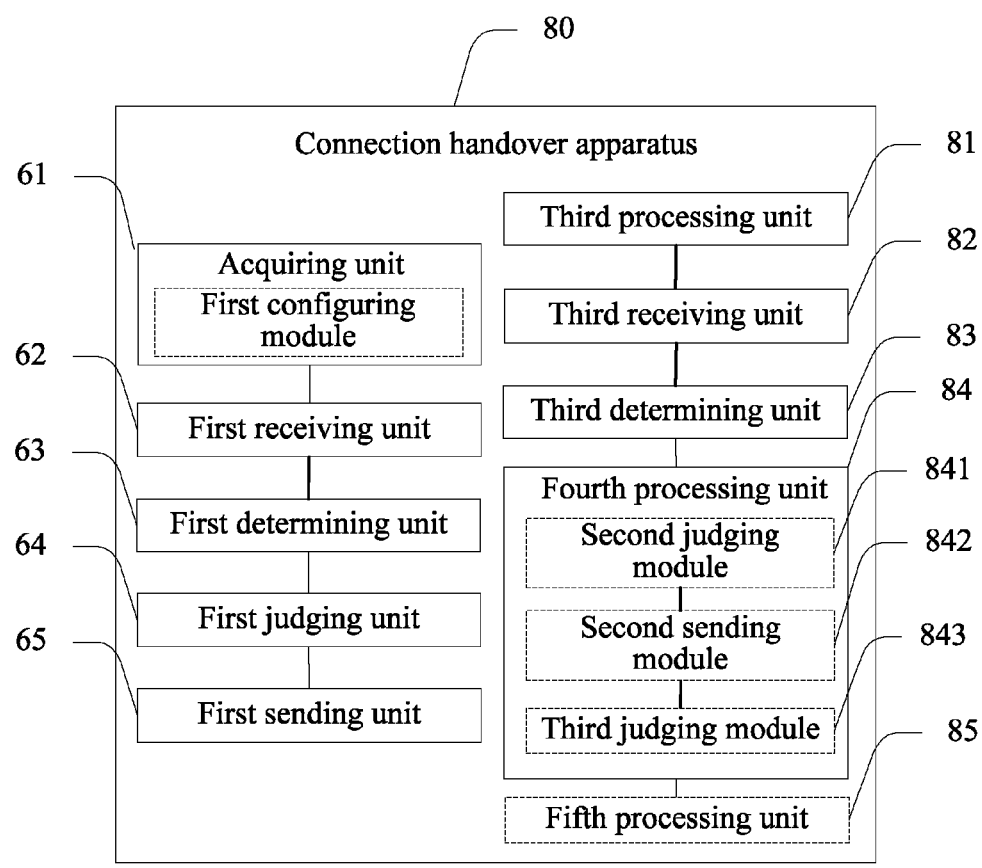
FIG. 8 is a schematic structural diagram of a connection handover apparatus according to an embodiment of the present invention.

FIG. 8 is a schematic structural diagram of a connection handover apparatus according to an embodiment of the present invention. Referring to FIG. 8, in addition to an acquiring unit 61, a first receiving unit 62, a first determining unit 63, a first judging unit 64, and a first sending unit 65, a connection handover apparatus 80 further includes a third processing unit 81, a third receiving unit 82, a third determining unit 83, and a fourth processing unit 84:

For the acquiring unit 61, refer to the description in the embodiment shown in FIG. 6.

Optionally, in an implementation manner of this embodiment, the acquiring unit 61 includes a first configuring module, configured to configure idle connection resource information of the zeroth terminal for a near field communication controller NFCC of the zeroth terminal by using a device host DH of the zeroth terminal, so that the first judging unit 64 determines, according to the idle connection resource information of the zeroth terminal, whether the zeroth terminal has an idle connection resource.

The first receiving unit 62 receives a first device activation request that is sent by a handover medium and is used for initiating a device activation request that is (in this case, a first terminal serves as a handover medium, and is configured to assist the zeroth terminal and a second terminal in establishing a connection), where the first device activation request carries a first action identifier and a third identifier that is used for identifying the handover medium.

The first determining unit 63 determines, according to the first action identifier, that a connection handover process needs to be performed, and triggers the first judging unit 64.

The first judging unit 64 determines, according to the idle connection resource information of the zeroth terminal, that the zeroth terminal has an idle connection resource, and triggers the first sending unit 65 and the third processing unit 81. (In a case in which the zeroth terminal has no idle connection resource, refer to the description in the embodiment shown in FIG. 6.)

The first sending unit 65 sends a first device activation response to the handover medium, so as to perform a connection handover process with the first terminal and feed back connection configuration information of the zeroth terminal to the first terminal in the connection handover process.

The third processing unit 81 is configured to reserve a connection resource for the second terminal to update the idle connection resource information of the zeroth terminal.

The third receiving unit 82 is configured to: after the connection handover apparatus 80 sends the first device activation response and reserves the connection resource for the second terminal, and before a connection is established between the zeroth terminal and the second terminal, receive a second device activation request sent by a third terminal, where the second device activation request carries a second action identifier and a fourth identifier that is used for identifying the third terminal.

The third determining unit 83 is configured to determine, according to the second action identifier, that a connection handover process needs to be performed, and trigger the fourth processing unit 84.

The fourth processing unit 84 is configured to determine, according to the fourth identifier and the third identifier, whether the third terminal and the handover medium are the same terminal, so as to determine whether to send a second device activation response to the third terminal.

Optionally, in an implementation manner of this embodiment, the fourth processing unit 84 includes:

a second judging module 841, configured to determine, according to the fourth identifier and the third identifier, whether the third terminal and the handover medium are the same terminal, and if yes, trigger a second sending module 842, otherwise, trigger a third judging module 843;

the second sending module 842, configured to send the second device activation response, so as to perform a connection handover process with the third terminal and feed back the connection configuration information of the zeroth terminal to the third terminal in the connection handover process; and the third judging module 843, configured to perform determining according to an idle connection resource after the zeroth terminal reserves the connection resource for the second terminal, to determine whether the zeroth terminal has an idle connection resource, and if yes, trigger the second sending module 842, otherwise, skip triggering the second sending module 842.

Optionally, in an implementation manner of this embodiment, the connection handover apparatus 80 further includes:

a fifth processing unit 85, configured to reserve a connection resource for the third terminal. For example, when the third terminal is a connection handover requester, and the zeroth terminal still has an idle connection resource after the zeroth terminal reserves the connection resource for the second terminal, the fifth processing unit 85 is triggered.

In addition to the technical effect in the embodiment shown in FIG. 7, when a zeroth terminal has no idle connection resource, the connection handover apparatus 80 provided in this embodiment can further directly determine not to respond to a device activation request sent by a handover medium or a third terminal, so that subsequent processes such as LLCP activation and data exchange are not executed, that is, an NFC communication procedure is terminated in advance, and a process, for example, in which Bluetooth and/or Wi-Fi of the zeroth terminal attempts to establish a wireless connection is avoided, thereby greatly saving communication time, and improving communication efficiency.

A person skilled in the art should understand that in the embodiments of the present invention, idle connection resource information of a zeroth terminal includes the number of idle Bluetooth connection resources, and/or, the number of idle Wi-Fi connection resources, and may also include the number of idle connection resources of other connection technologies that can perform a connection handover in an NFC communication manner. Correspondingly, a communication terminal may further include other communications modules in addition to Bluetooth and/or W-Fi modules. If the embodiments of the present invention are used, other communications modules may also be effectively and properly triggered, thereby improving communication efficiency.

Figure 9A:
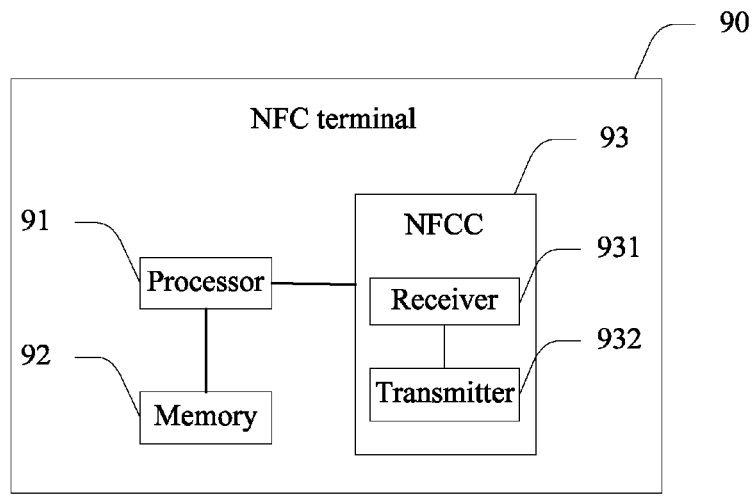
FIG. 9A is a schematic structural diagram of an NFC terminal according to an embodiment of the present invention.

FIG. 9A is a schematic structural diagram of an NFC terminal according to an embodiment of the present invention. Referring to FIG. 9A, an NFC terminal 90 includes:

a processor 91, and a memory 92 and an NFCC 93 that are connected to the processor 91, where a corresponding program, application, data or instruction is stored in the memory 92 for invocation by the processor 91, the processor 91 and the NFCC 93 perform communication by using the NCI specification, and the NFCC 93 includes a receiver 931 and a transmitter 932 that are configured to perform message reception and transmission. Specifically:

The processor 91 acquires idle connection resource information of the NFC terminal 90.

The NFCC 93 receives, by using the receiver 931, a request message sent by a first terminal, and triggers the processor 91 to determine, according to the request message, to perform a first determining, where the request message is used for initiating a connection handover process or used for notifying the NFC terminal 90 that a connection handover process needs to be performed, and the first determining is: determining, according to the idle connection resource information of the NFC terminal 90, whether the NFC terminal 90 has an idle connection resource.

The processor 91 performs the first determining, and if it is determined that the NFC terminal 90 has an idle connection resource, the processor 91 sends a response message to the first terminal by using the transmitter 932 of the NFCC 93, so as to feed back connection configuration information of the NFC terminal 90 to the first terminal, or if it is determined that the NFC terminal 90 has no idle connection resource, the processor 91 determines not to feed back connection configuration information of the NFC terminal 90 to the first terminal.

Optionally, the idle connection resource information of the NFC terminal 90 includes: the number of idle Bluetooth connection resources, and/or, the number of idle Wi-Fi connection resources.

Optionally, in an implementation manner of this embodiment, when the first terminal is a handover medium: the request message is a first connection handover request used for initiating a connection handover process, the response message is a first connection handover medium message including the connection configuration information of the NFC terminal 90, the connection configuration information of the NFC terminal 90 includes: Bluetooth connection configuration information and/or Wi-Fi connection configuration information of the NFC terminal 90.

Further optionally:

the first connection handover request carries a first identifier used for identifying the first terminal, the first terminal is a handover medium configured to assist the NFC terminal 90 and a second terminal in establishing a connection, and in this case, if the processor 91 judges that the NFC terminal 90 has an idle connection resource, the processor 91 further reserves a connection resource for the second terminal to update the idle connection resource information of the NFC terminal 90; and after the transmitter 932 sends the first connection handover medium message and the processor 91 reserves the connection resource for the second terminal, and before the NFC terminal 90 establishes a connection with the second terminal, the following processing is executed:

receiving, by the NFCC 93 by using the receiver 931, a second connection handover request sent by a third terminal, and triggering the processor 91 to perform second determining, where the second connection handover request carries a second identifier used for identifying the third terminal, and the second determining is: determining, according to the second identifier and the first identifier, whether the third terminal and the first terminal are the same terminal, so as to determine whether to feed back the connection configuration information of the NFC terminal 90 to the third terminal.

The processor 91 may determine, in the following manner, whether to feed back the connection configuration information of the NFC terminal 90 to the third terminal:

when the third terminal and the first terminal are the same terminal, sending a second connection handover medium message including the connection configuration information of the NFC terminal 90 to the third terminal by using the transmitter 932 of the NFCC 93; and when the third terminal and the first terminal are not the same terminal, determining, according to an idle connection resource after the processor 91 reserves the connection resource for the second terminal, whether to feed back the connection configuration information of the NFC terminal 90 to the third terminal, including the following two scenarios:

Scenario 1: Determine, according to an idle connection resource after the processor 91 reserves the connection resource for the second terminal, whether the NFC terminal 90 has an idle connection resource. In a case in which the NFC terminal 90 has no idle connection resource, if the third terminal is a connection handover requester, send a first connection handover selection message to the third terminal by using the transmitter 932 of the NFCC 93 to indicate that a connection resource of the NFC terminal 90 is limited (for example, the first connection handover selection message includes an error code used for representing that a connection resource of the NFC terminal 90 is limited and a cause value). If the third terminal is a handover medium, send a third connection handover medium message only including a message header and a message trailer to the third terminal by using the transmitter 932 of the NFCC 93.

Scenario 2: In a case in which the NFC terminal 90 has an idle connection resource, if the third terminal is a connection handover requester, send a second connection handover selection message including the connection configuration information of the NFC terminal 90 to the third terminal by using the transmitter 932 of the NFCC 93; and if the third terminal is a handover medium, send a fourth connection handover medium message including the connection configuration information of the NFC terminal 90 to the third terminal by using the transmitter 932 of the NFCC 93.

Optionally, in an implementation manner of this embodiment, the processor 91 is further configured to reserve a connection resource for the third terminal (for example, when the third terminal is a connection handover requester).

A person skilled in the art should understand that, in the embodiment shown in FIG. 9A, the processor 91 implements a DH function of the NFC terminal 90.

Figure 9B:
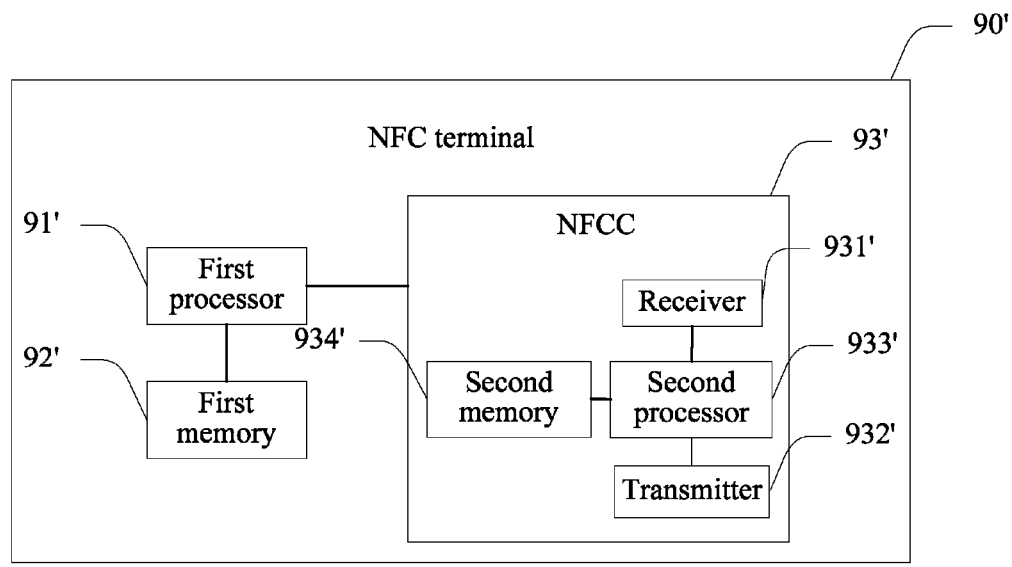
FIG. 9B is a schematic structural diagram of an NFC terminal according to an embodiment of the present invention.

FIG. 9B is a schematic structural diagram of an NFC terminal according to an embodiment of the present invention. Referring to FIG. 9B, an NFC terminal 90' includes:

a first processor 91', and a first memory 92' and an NFCC 93' that are connected to the first processor 91', where a corresponding program, application, data or instruction is stored in the first memory 92' for invocation by the first processor 91', the first processor 91' and the NFCC 93' perform communication by using the NCI specification, and the NFCC 93' includes a receiver 931', a transmitter 932', a second processor 933', and a second memory 934', and a corresponding program, application, data or instruction is stored in the second memory 934' for invocation by the second processor 933'. Specifically:

The second processor 933' acquires idle connection resource information of the NFC terminal 90'.

The NFCC 93' receives, by using the receiver 931', a request message sent by a first terminal, and triggers the second processor 933' to determine, according to the request message, to perform a first determining, where the request message is used for initiating a connection handover process or used for notifying the NFC terminal 90' that a connection handover process needs to be performed, and the first determining is: determining, according to the idle connection resource information of the NFC terminal 90', whether the NFC terminal 90' has an idle connection resource.

The second processor 933' performs the first determining, and if it is determined that the NFC terminal 90' has an idle connection resource, the second processor 933' sends a response message to the first terminal by using the transmitter 932' so as to feed back connection configuration information of the NFC terminal 90' to the first terminal, or if it is determined that the NFC terminal 90' has no idle connection resource, the second processor 933' determines not to feed back connection configuration information of the NFC terminal 90' to the first terminal.

Optionally, in an implementation manner of this embodiment, the acquiring, by the second processor 933', the idle connection resource information of the NFC terminal 90' includes: acquiring, by the first processor 91', the idle connection resource information of the NFC terminal 90', and configuring the idle connection resource information of the NFC terminal 90' for the NFCC 93' according to the NCI specification. Specifically, for the configuration process, refer to the embodiment shown in FIG. 5A1, FIG. 5A2, FIG. 5B1, and FIG. 5B2.

Optionally, in an implementation manner of this embodiment, when the first terminal is a handover medium: the request message is a first device activation request used for initiating a device activation request, and the first device activation request carries a first action identifier, so that the NFC terminal 90' determines, according to the first action identifier, that a connection handover process needs to be performed, so as to determine that the first determining needs to be performed; and the response message is a first device activation response, so as to perform a connection handover process with the first terminal and feed back the connection configuration information of the NFC terminal 90' to the first terminal in the connection handover process, and the connection configuration information of the NFC terminal 90' includes: Bluetooth connection configuration information, and/or Wi-Fi connection configuration information of the NFC terminal 90'.

Further optionally:

the first device activation request further carries a third identifier used for identifying the first terminal, the first terminal is a handover medium configured to assist the NFC terminal 90' and a second terminal in establishing a connection, and in this case, if the second processor 933' judges that the NFC terminal 90' has an idle connection resource, the second processor 933' further reserves a connection resource for the second terminal to update the idle connection resource information of the NFC terminal 90'; and after the first connection handover medium message is sent and the connection resource is reserved for the second terminal, and before a connection is established between the NFC terminal 90' and the second terminal, the following processing is further executed:

receiving, by the NFCC 93' by using the receiver 931', a second device activation request sent by a third terminal, and triggering the second processor 933' to perform second determining, where the second device activation request carries a second action identifier and a fourth identifier, the fourth identifier is used for identifying the third terminal, the second processor 933' determines, according to the second action identifier, to perform the second determining, and the second determining is: determining, according to the fourth identifier and the third identifier, whether the third terminal and the first terminal are the same terminal, so as to determine whether to send a second device activation response to the third terminal by using the transmitter 932'.

If the third terminal and the first terminal are the same terminal, the second device activation response is sent, so as to perform a connection handover process with the third terminal and feed back the connection configuration information of the NFC terminal 90' to the third terminal in the connection handover process. If the third terminal and the first terminal are not the same terminal, determining is performed according to an idle connection resource after the second processor 933' reserves the connection resource for the second terminal, to determine whether the NFC terminal 90' has an idle connection resource, and if yes, the foregoing second device activation response is sent, otherwise, the foregoing second device activation response is not sent.

Optionally, in an implementation manner of this embodiment, the second processor 933' is further configured to reserve a connection resource for the third terminal (for example, when the third terminal is a connection handover requester).

Optionally, in the embodiment shown in FIG. 9B, the first processor 91' implements a DH function of the NFC terminal 90'.

Figure 10:
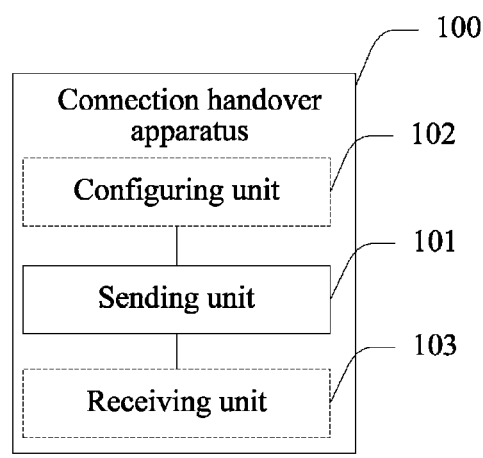
FIG. 10 is a schematic structural diagram of a connection handover apparatus according to an embodiment of the present invention.

FIG. 10 is a schematic structural diagram of a connection handover apparatus according to an embodiment of the present invention. Referring to FIG. 10, a connection handover apparatus 100 includes:

a sending unit 101, configured to send a request message to a zeroth terminal, where the request message is used for initiating a connection handover process, or used for notifying the zeroth terminal that a connection handover process needs to be performed. The request message includes a terminal identifier, and the terminal identifier is used for identifying a sender of the request message, so that the zeroth terminal identifies the sender of the request message according to the terminal identifier.

Optionally, the request message is a connection handover request used for initiating a connection handover process; or, the request message is a device activation request carrying an action identifier, so that the zeroth terminal determines, according to the action identifier, that a connection handover process needs to be performed.

Optionally, in an implementation manner of this embodiment, the apparatus 100 further includes:

a configuring unit 102, configured to configure the terminal identifier and the action identifier for an NFCC by using a DH, so that the sending unit 101 sends the device activation request.

Optionally, in an implementation manner of this embodiment, the apparatus 100 further includes:

a receiving unit 103, configured to receive a response message sent after the zeroth terminal receives the request message, where in a case in which the request message is the connection handover request, if the zeroth terminal has an idle connection resource, the response message includes connection configuration information of the zeroth terminal, otherwise, the response message does not include the connection configuration information; and in a case in which the request message is the device activation request, when the zeroth terminal has an idle connection resource, the response message is a device activation response.

The apparatus 100 provided in this embodiment is configured to perform NFC communication with a zeroth terminal, and send a terminal identifier of the apparatus 100 to the zeroth terminal by using a connection handover request message or a device activation request message, so that the zeroth terminal identifies and distinguishes, according to the terminal identifier, a terminal that performs NFC communication with the zeroth terminal.

Figure 11:
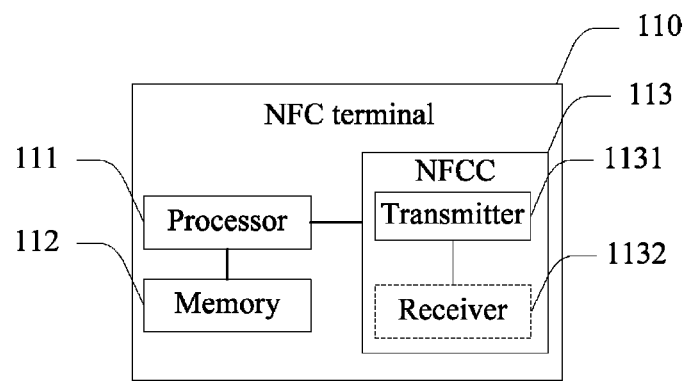
FIG. 11 is a schematic structural diagram of an NFC terminal according to an embodiment of the present invention.

FIG. 11 is a schematic structural diagram of an NFC terminal according to an embodiment of the present invention. Referring to FIG. 11, the NFC terminal 110 includes:

a processor 111, and a memory 112 and an NFCC 113 that are connected to the processor 111, where a corresponding program, application, data or signaling is stored in the memory 112 for invocation by the processor 111, the processor 111 and the NFCC 113 perform communication by using the NCI specification, and the NFCC 113 includes a transmitter 1131. Specifically:

The processor 111 sends a request message to a zeroth terminal by using the transmitter 1131, where the request message is used for initiating a connection handover process, or used for notifying the zeroth terminal that a connection handover process needs to be performed, where the request message includes a terminal identifier, and the terminal identifier is used for identifying a sender of the request message, so that the zeroth terminal identifies the sender of the request message according to the terminal identifier.

Optionally, the request message is a connection handover request used for initiating a connection handover process; or, the request message is a device activation request carrying an action identifier, so that the zeroth terminal determines, according to the action identifier, that a connection handover process needs to be performed.

Further optionally, the processor 111 configures the terminal identifier and the action identifier for the NFCC 113 according to the NCI specification, so as to send the device activation request by using the transmitter 1131 of the NFCC 113.

Optionally, the NFCC 113 further includes a receiver 1132, and the processor 111 receives, by using the receiver 1132 of the NFCC 113, a response message sent by the zeroth terminal after the zeroth terminal receives the request message, where:

in a case in which the request message is the connection handover request, if the zeroth terminal has an idle connection resource, the response message includes the connection configuration information of the zeroth terminal, otherwise, the response message does not include the connection configuration information of the zeroth terminal; and when the request message is the device activation request and the zeroth terminal has an idle connection resource, the response message is a device activation response.

A person skilled in the art should understand that the processor 91 in FIG. 9A and the first processor 91' in FIG. 9B may be central processing units (Central Processing Unit, CPU), or may further be other general processors, digital signal processors (DSP), application-specific integrated circuits (ASIC), field-programmable gate arrays (FPGA) or other programmable logic devices, discrete gates or transistor logic devices, discrete hardware components, and the like. In addition, there may exist a terminal that has the functions of all the parts in the embodiments shown in FIG. 9A, FIG. 9B, and FIG. 11.

Refer to the description in the method embodiments for the detailed description of functions of the units, modules or components in the apparatus embodiments of the present invention, which are not described herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. Any equivalent modification made in accordance with the claims of the present invention shall fall within the scope of the present invention.

What is claimed is:

1. A connection handover method based on near field communication, comprising:

acquiring, by a zeroth terminal, idle connection resource information of the zeroth terminal;

receiving a request message sent by a first terminal, wherein the request message is used for initiating a connection handover process, or used for notifying the zeroth terminal that a connection handover process needs to be performed; and determining, according to the request message, that the following first determining needs to be performed:

determining, according to the idle connection resource information of the zeroth terminal, whether the zeroth terminal has an idle connection resource, and if so, sending a response message to the first terminal, so as to feed back connection configuration information of the zeroth terminal to the first terminal, and if not, skipping feeding back connection configuration information of the zeroth terminal to the first terminal, wherein when the first terminal is a handover medium:

the receiving a request message sent by a first terminal comprises: receiving a first device activation request used for initiating a device activation request, wherein the first device activation request carries a first action identifier, so that the zeroth terminal determines, according to the first action identifier, that a connection handover process needs to be performed, so as to determine that the first determining needs to be performed; and the sending a response message to the first terminal comprises: sending a first device activation response, so as to perform a connection handover process with the first terminal and feed back the connection configuration information of the zeroth terminal to the first terminal in the connection handover process, wherein the connection configuration information of the zeroth terminal comprises: Bluetooth connection configuration information, and/or Wi-Fi connection configuration information of the zeroth terminal.

2. A connection handover method based on near field communication, comprising:

acquiring, by a zeroth terminal, idle connection resource information of the zeroth terminal;

receiving a request message sent by a first terminal, wherein the request message is used for initiating a connection handover process, or used for notifying the zeroth terminal that a connection handover process needs to be performed; and determining, according to the request message, that the following first determining needs to be performed:

determining, according to the idle connection resource information of the zeroth terminal, whether the zeroth terminal has an idle connection resource, and if so, sending a response message to the first terminal, so as to feed back connection configuration information of the zeroth terminal to the first terminal, and if not, skipping feeding back connection configuration information of the zeroth terminal to the first terminal, wherein when the first terminal is a handover medium:

the receiving a request message sent by a first terminal comprises: receiving a first connection handover request used for initiating a connection handover process, so as to determine that the first determining needs to be performed; and the sending a response message to the first terminal comprises: sending a first connection handover medium message comprising the connection configuration information of the zeroth terminal, wherein the connection configuration information of the zeroth terminal comprises: Bluetooth connection configuration information, and/or Wi-Fi connection configuration information of the zeroth terminal.

3. The method according to claim 2, wherein, the first connection handover request carries a first identifier used for identifying the first terminal;

the first terminal is a handover medium configured to assist the zeroth terminal and a second terminal in establishing a connection;

if it is determined that the zeroth terminal has an idle connection resource, the method further comprises:

reserving, by the zeroth terminal, a connection resource for the second terminal to update the idle connection resource information of the zeroth terminal; and after the sending a first connection handover medium message and reserving a connection resource for the second terminal, and before a connection is established between the zeroth terminal and the second terminal, the method further comprises:

receiving a second connection handover request sent by a third terminal, wherein the second connection handover request carries a second identifier used for identifying the third terminal; and determining, according to the second identifier and the first identifier, whether the third terminal and the first terminal are the same terminal, so as to determine whether to feed back the connection configuration information of the zeroth terminal to the third terminal.

4. The method according to claim 3, wherein the determining whether to feed back the connection configuration information of the zeroth terminal to the third terminal comprises:

when the third terminal and the first terminal are the same terminal, sending a second connection handover medium message to the third terminal, wherein the second connection handover medium message comprises the connection configuration information of the zeroth terminal; and when the third terminal and the first terminal are not the same terminal, determining, according to an idle connection resource after the zeroth terminal reserves the connection resource for the second terminal, whether to feed back the connection configuration information of the zeroth terminal to the third terminal.

5. The method according to claim 4, wherein the determining, according to an idle connection resource after the zeroth terminal reserves the connection resource for the second terminal, whether to feed back the connection configuration information of the zeroth terminal to the third terminal comprises:

determining, according to the idle connection resource after the zeroth terminal reserves the connection resource for the second terminal, whether the zeroth terminal has an idle connection resource, and in a case in which the zeroth terminal has no idle connection resource, if the third terminal is a connection handover requester, sending a first connection handover selection message to the third terminal to indicate that a connection resource of the zeroth terminal is limited; and if the third terminal is a handover medium, sending a third connection handover medium message only comprising a message header and a message trailer to the third terminal; or in a case in which the zeroth terminal has an idle connection resource, if the third terminal is a connection handover requester, sending a second connection handover selection message to the third terminal, wherein the second connection handover selection message comprises the connection configuration information of the zeroth terminal; and if the third terminal is a handover medium, sending a fourth connection handover medium message to the third terminal, wherein the fourth connection handover medium message comprises the connection configuration information of the zeroth terminal.

6. The method according to claim 5, wherein the first connection handover selection message comprises: an error code used for representing that a connection resource of the zeroth terminal is limited and a cause value.

7. The method according to claim 3, wherein,
the first device activation request further carries a third identifier used for identifying the first terminal;
the first terminal is a handover medium configured to assist the zeroth terminal and a second terminal in establishing a connection;
if it is determined that the zeroth terminal has an idle connection resource, the method further comprises:
reserving, by the zeroth terminal, a connection resource for the second terminal to update the idle connection resource information of the zeroth terminal; and
after the sending a first device activation response and reserving a connection resource for the second terminal, and before a connection is established between the zeroth terminal and the second terminal, the method further comprises:
receiving a second device activation request sent by a third terminal, wherein the second device activation request carries a second action identifier and a fourth identifier, and the fourth identifier is used for identifying the third terminal;
determining, according to the second action identifier, that a connection handover process needs to be performed; and
determining, according to the fourth identifier and the third identifier, whether the third terminal and the first terminal are the same terminal, so as to determine whether to send a second device activation response to the third terminal.

8. The method according to claim 7, wherein,
the determining, according to the idle connection resource information of the zeroth terminal, whether the zeroth terminal has an idle connection resource comprises:
determining, by a near field communication controller (NFCC) of the zeroth terminal according to the idle connection resource information of the zeroth terminal configured by a device host (DH) for the NFCC of the zeroth terminal, whether the zeroth terminal has an idle connection resource;
the first terminal configures, using a DH, the first action identifier and the third identifier for an NFCC of the first terminal, so as to send the first device activation request by using the NFCC of the first terminal; and
the second action identifier and the fourth identifier in the second device activation request are configured by the third terminal for an NFCC of the third terminal using a DH, and the NFCC of the third terminal sends the second device activation request.

9. The method according to claim 7, wherein, the determining whether to send a second device activation response to the third terminal comprises:
if the third terminal and the first terminal are the same terminal, sending the second device activation response, so as to perform a connection handover process with the third terminal and feed back the connection configuration information of the zeroth terminal to the third terminal in the connection handover process; and
if the third terminal and the first terminal are not the same terminal, performing determining according to an idle connection resource after the zeroth terminal reserves the connection resource for the second terminal, to determine whether the zeroth terminal has an idle connection resource, if yes, sending the second device activation response, so as to perform a connection handover process with the third terminal and feed back the connection configuration information of the zeroth terminal to the third terminal in the connection handover process, otherwise, skipping sending the second device activation response.

10. A connection handover method based on near field communication, comprising:
acquiring, by a zeroth terminal, idle connection resource information of the zeroth terminal;
receiving a request message sent by a first terminal, wherein the request message is used for initiating a connection handover process, or used for notifying the zeroth terminal that a connection handover process needs to be performed; and
determining, according to the request message, that the following first determining needs to be performed:
determining, according to the idle connection resource information of the zeroth terminal, whether the zeroth terminal has an idle connection resource, and if so, sending a response message to the first terminal, so as to feed back connection configuration information of the zeroth terminal to the first terminal, and if not, skipping feeding back connection configuration information of the zeroth terminal to the first terminal, wherein if the first terminal is a connection handover requester:
the request message is a third connection handover request used for initiating a connection handover process, and the response message is a third connection handover selection message comprising the connection configuration information of the zeroth terminal; or,
the request message is a third device activation request carrying a third action identifier, so that the zeroth terminal determines, according to the third action identifier, that a connection handover process needs to be performed, wherein the third action identifier is configured by the first terminal using a device host (DH) for a near field communication controller (NFCC) of the first terminal, so as to send the third device activation request by using the NFCC of the first terminal; the response message is a third device activation response, so as to perform a connection handover process with the first terminal and feed back the connection configuration information of the zeroth terminal to the first terminal in the connection handover process; and the determining, according to the idle connection resource information of the zeroth terminal, whether the zeroth terminal has an idle connection resource comprises: determining, by an NFCC of the zeroth terminal according to the idle connection resource information of the zeroth terminal configured by a DH for the NFCC of the zeroth terminal, whether the zeroth terminal has an idle connection resource.

11. A near field comunication (NFC) terminal, comprising:
a processor;
a memory and an NFC controller (NFCC) that are connected to the processor, where a corresponding program, application, data or instruction is stored in the memory for invocation by the processor, the processor and the NFCC perform communication using the NCI specification, and the NFCC comprises a receiver and a transmitter that are configured to perform message reception and transmission; wherein:
the processor acquires idle connection resource information of the NFC terminal;
the NFCC receives, using the receiver, a request message sent by a first terminal, and triggers the processor to determine, according to the request message, to perform a first determining, where the request message is used for initiating a connection handover process or used for notifying the NFC terminal that a connection handover process needs to be performed, and the first determining is: determining, according to the idle connection resource information of the NFC terminal, whether the NFC terminal has an idle connection resource;

the processor performs the first determining, and if it is determined that the NFC terminal has an idle connection resource, the processor sends a response message to the first terminal by using the transmitter of the NFCC, so as to feed back connection configuration information of the NFC terminal to the first terminal, or if it is determined that the NFC terminal has no idle connection resource, the processor determines not to feed back connection configuration information of the NFC terminal to the first terminal, wherein:

the first connection handover request carries a first identifier used for identifying the first terminal, the first terminal is a handover medium configured to assist the NFC terminal and a second terminal in establishing a connection, and in this case, if the processor judges that the NFC terminal has an idle connection resource, the processor further reserves a connection resource for the second terminal to update the idle connection resource information of the NFC terminal; and after the transmitter sends the first connection handover medium message and the processor reserves the connection resource for the second terminal, and before the NFC terminal establishes a connection with the second terminal, the following processing is executed:

receiving, by the NFCC using the receiver, a second connection handover request sent by a third terminal, and triggering the processor to perform second determining, where the second connection handover request carries a second identifier used for identifying the third terminal, and the second determining is: determining, according to the second identifier and the first identifier, whether the third terminal and the first terminal are the same terminal, so as to determine whether to feed back the connection configuration information of the NFC terminal to the third terminal.

12. The NFC terminal according to claim 11, wherein:
the request message is a first connection handover request used for initiating a connection handover process;
the response message is a first connection handover medium message comprising the connection configuration information of the NFC terminal.

13. A near field communication (NFC) terminal, comprising:

a first processor, and a first memory and an NFC controller (NFCC) that are connected to the first processor, where a corresponding program, application, data or instruction is stored in the first memory for invocation by the first processor, the first processor and the NFCC perform communication using the NFC control interface (NCI) specification, and the NFCC includes a receiver, a transmitter, a second processor, and a second memory, and a corresponding program, application, data or instruction is stored in the second memory for invocation by the second processor, wherein:

the second processor acquires idle connection resource information of the NFC terminal;

the NFCC receives, using the receiver, a request message sent by a first terminal, and triggers the second processor to determine, according to the request message, to perform a first determining, where the request message is used for initiating a connection handover process or used for notifying the NFC terminal that a connection handover process needs to be performed, and the first determining is: determining, according to the idle connection resource information of the NFC terminal, whether the NFC terminal has an idle connection resource;

the second processor performs the first determining, and if it is determined that the NFC terminal has an idle connection resource, the second processor sends a response message to the first terminal by using the transmitter so as to feed back connection configuration information of the NFC terminal to the first terminal, or if it is determined that the NFC terminal has no idle connection resource, the second processor determines not to feed back connection configuration information of the NFC terminal to the first terminal, wherein the acquiring, by the second processor, the idle connection resource information of the NFC terminal comprises:

acquiring, by the first processor, the idle connection resource information of the NFC terminal, and configuring the idle connection resource information of the NFC terminal for the NFCC according to the NCI specification.

14. The NFC terminal according to claim 13, wherein:
the request message is a first device activation request used for initiating a device activation request, and the first device activation request carries a first action identifier, so that the NFC terminal determines, according to the first action identifier, that a connection handover process needs to be performed, so as to determine that the first determining needs to be performed; and the response message is a first device activation response, so as to perform a connection handover process with the first terminal and feed back the connection configuration information of the NFC terminal to the first terminal in the connection handover process.

15. The NFC terminal according to claim 14, wherein:
the first device activation request further carries a third identifier used for identifying the first terminal, the first terminal is a handover medium configured to assist the NFC terminal and a second terminal in establishing a connection, and in this case, if the second processor judges that the NFC terminal has an idle connection resource, the second processor further reserves a connection resource for the second terminal to update the idle connection resource information of the NFC terminal; and after the first connection handover medium message is sent and the connection resource is reserved for the second terminal, and before a connection is established between the NFC terminal and the second terminal, the following processing is further executed:

receiving, by to NFCC by using the receiver, a second device activation request sent by a third terminal, and triggering the second processor to perform second determining, where the second device activation request carries a second action identifier and a fourth identifier, the fourth identifier is used for identifying the third terminal, the second processor determines, according to the second action identifier, to perform the second determining, and the second determining is: determining, according to the fourth identifier and the third identifier, whether the third terminal and the first terminal are the same terminal, so as to determine whether to send a second device activation response to the third terminal by using the transmitter;

if the third terminal and the first terminal are the same terminal, the second device activation response is sent, so as to perform a connection handover process with the third terminal and feed back the connection configuration information of the NFC terminal to the third terminal in the connection handover process if the third terminal and the first terminal are not the same terminal, determining is performed according to an idle connection resource after the second processor reserves the connection resource for the second terminal, to determine whether the NFC terminal has an idle connection resource, and if so, the foregoing second device activation response is sent, otherwise, the foregoing second device activation response is not sent.

16. A near field communication (NFC) terminal, comprising:
   a processor, and a memory and an NFC controller (NFCC) that are connected to the processor, where a corresponding program, application, data or signaling is stored in the memory for invocation by the processor, the processor and the NFCC perform communication by using the NFC control interface (NCI) specification, and the NFCC includes a transmitter, wherein:
   the processor sends a request message to a zeroth terminal using the transmitter, where the request message is used for initiating a connection handover process, or used for notifying the zeroth terminal that a connection handover process needs to be performed, where the request message includes a terminal identifier, and the terminal identifier is used for identifying a sender of the request message, so that the zeroth terminal identifies the sender of the request message according to the terminal identifier;
   wherein the NFCC further comprises a receiver, and the processor receives, using the receiver of the NFCC, a response message sent by the zeroth terminal after the zeroth terminal receives the request message, wherein:
   in a case in which the request message is the connection handover request, if the zeroth terminal has an idle connection resource, the response message includes the connection configuration information of the zeroth terminal, otherwise, the response message does not include the connection configuration information of the zeroth terminal; and when the request message is the device activation request and the zeroth terminal has an idle connection resource, the response message is a device activation response.

* * * * *